US012653090B2

(12) United States Patent
Conrad

(10) Patent No.: US 12,653,090 B2
(45) Date of Patent: Jun. 16, 2026

(54) SHRINK-WRAPPED SEED PILLOWS

(71) Applicant: BALL HORTICULTURAL COMPANY, West Chicago, IL (US)

(72) Inventor: Robert Scott Conrad, Wheaton, IL (US)

(73) Assignee: BALL HORTICULTURAL COMPANY, West Chicago, IL (US)

( * ) Notice: Subject to any disclaimer, the term of this patent is extended or adjusted under 35 U.S.C. 154(b) by 410 days.

(21) Appl. No.: 18/143,139

(22) Filed: May 4, 2023

(65) Prior Publication Data

US 2024/0365700 A1 Nov. 7, 2024

(51) Int. Cl.
A01C 1/04 (2006.01)
C09D 5/14 (2006.01)

(52) U.S. Cl.
CPC ................ A01C 1/046 (2013.01); C09D 5/14 (2013.01); *A01C 2001/048* (2013.01)

(58) Field of Classification Search
CPC ..... A01C 1/04; A01C 1/046; A01C 2001/048; A01C 1/06
USPC .............................................................. 47/56
See application file for complete search history.

(56) References Cited

U.S. PATENT DOCUMENTS

| | | | | |
|---|---|---|---|---|
| 2,323,746 A | * | 7/1943 | Woolf | A01C 1/046 206/484 |
| 6,070,358 A | * | 6/2000 | Meikle | A01G 20/00 47/56 |

| | | | | |
|---|---|---|---|---|
| 6,516,565 B1 | | 2/2003 | Fima | |
| 7,108,764 B2 | * | 9/2006 | Schneider | B29C 66/92613 156/580.2 |
| 7,174,671 B2 | * | 2/2007 | Moore | A01G 20/20 47/56 |
| 12,344,428 B2 | * | 7/2025 | Skeberg | B65B 29/00 |
| 2005/0034820 A1 | * | 2/2005 | Schneider | B29C 66/92613 156/580.2 |
| 2016/0286715 A1 | | 10/2016 | Kraus | |
| 2017/0247172 A1 | | 8/2017 | Edwards et al. | |

(Continued)

FOREIGN PATENT DOCUMENTS

| | | |
|---|---|---|
| AU | 6442180 A | 5/1981 |
| CA | 2135338 C | 8/2003 |
| GB | 2325137 A | 11/1998 |

OTHER PUBLICATIONS

Dils, Christian et al. (2023). Use of Rotary Ultrasonic Plastic Welding as a Continuous Interconnection Technology for Large-Area e-Textiles. Textiles. 3.10.3390/textiles3010006. (Year: 2023).*

(Continued)

*Primary Examiner* — Brady W Frazier
(74) *Attorney, Agent, or Firm* — MARSHALL, GERSTEIN & BORUN LLP

(57) ABSTRACT

Seed pillows are disclosed herein. An exemplary seed pillow may include a first water-soluble film, a seed cluster disposed on the first water-soluble film, and a second film that is positioned over the first water-soluble film and the seed cluster. The second film may have a first portion that is fused to a second portion of the first water-soluble film from ultrasonic vibrations. Further, the first water-soluble film and the second film may be shrink-wrapped around the seed cluster through heat application to the first water-soluble film and the second film for a first period of time.

18 Claims, 12 Drawing Sheets

(56) References Cited

U.S. PATENT DOCUMENTS

| | | | | |
|---|---|---|---|---|
| 2018/0272620 A1* | 9/2018 | Persson | ................... | B65B 51/26 |
| 2021/0378186 A1* | 12/2021 | Hoff | ....................... | A01G 24/50 |
| 2023/0089954 A1* | 3/2023 | Rivett | .................... | B32B 27/08 |
| | | | | 428/304.4 |
| 2023/0211907 A1* | 7/2023 | Skeberg | ................. | B65B 29/02 |
| | | | | 131/352 |

OTHER PUBLICATIONS

European Patent Application No. 24174055.4, Extended European Search Report, dated Oct. 18, 2024.

* cited by examiner

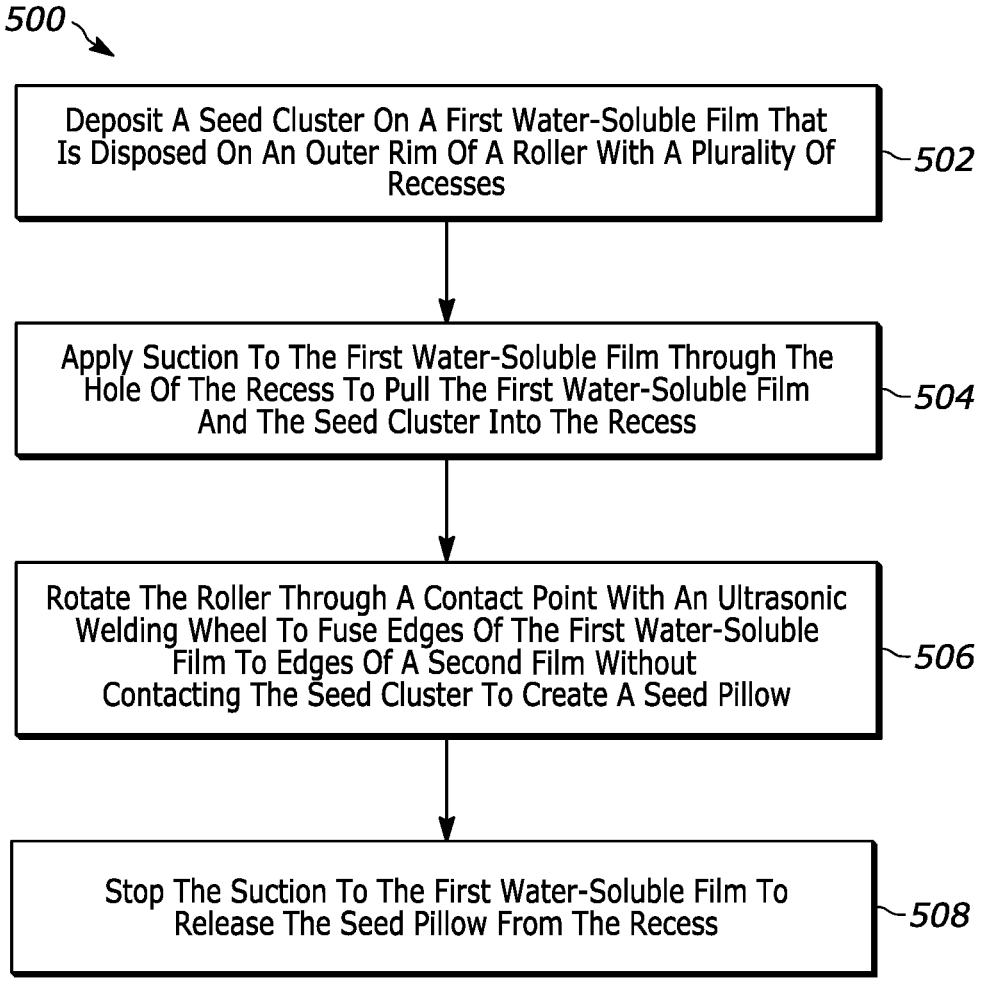

500

Deposit A Seed Cluster On A First Water-Soluble Film That Is Disposed On An Outer Rim Of A Roller With A Plurality Of Recesses          502

Apply Suction To The First Water-Soluble Film Through The Hole Of The Recess To Pull The First Water-Soluble Film And The Seed Cluster Into The Recess          504

Rotate The Roller Through A Contact Point With An Ultrasonic Welding Wheel To Fuse Edges Of The First Water-Soluble Film To Edges Of A Second Film Without Contacting The Seed Cluster To Create A Seed Pillow          506

Stop The Suction To The First Water-Soluble Film To Release The Seed Pillow From The Recess          508

FIG. 5A

SHRINK-WRAPPED SEED PILLOWS

TECHNICAL FIELD

The present disclosure generally relates to encapsulation techniques for seeds, and more particularly, to seed pillows that may be efficiently fused through an ultrasonic welding wheel, cut, and shrink-wrapped to produce a form factor that enables more accurate, consistent sowing.

BACKGROUND

Generally speaking, seed production and delivery is a technological area that is governed primarily by optimizing seed security and viability prior to and during sowing. These are not trivial concerns, as many seed types are fragile and therefore are easily damaged during the sorting, packaging, shipping, and/or sowing processes. Moreover, many seed types are heat sensitive, such that packaging techniques involving heat pose a significant challenge for conventional packaging systems.

Seed tape products are a common method of quickly and easily sowing multiple seeds in a typically linear fashion. However, these conventional seed tape products suffer from numerous drawbacks. For example, many conventional tape materials are either too weak for use in rapid planting equipment or are too robust after planting, and thereby interfere with the proper growth of the plants. These conventional seed tapes also typically have the seeds imbedded in or attached to the tape, which also results in several issues. For example, the adhesives used on the seeds and/or otherwise utilized to attach the seeds to the tape tend to reduce the proportion of seeds which eventually germinate, and may delay early stages of growth. Such adhesives may also strip, remove, or otherwise interfere with coatings applied to the seeds, thereby reducing the effectiveness of the coatings.

Therefore, techniques for preparing/packaging seeds for sowing is an area of great interest, and conventional techniques are generally insufficient for providing efficient, reliable preparation/packaging of seeds in manner that optimizes seed security and viability. Conventional techniques may also include additional ineffectiveness, inefficiencies, encumbrances, and/or other drawbacks.

SUMMARY

Generally, the present embodiments may relate to, inter alia, seed pillows that may be efficiently fused through an ultrasonic welding wheel, cut, and shrink-wrapped with a form factor that enables more accurate, consistent industrial sowing. For instance, the present embodiments may relate to a seed pillow formed by positioning a seed cluster between two layers of water-soluble film, and fusing the edges of the water-soluble film together. The seed cluster may be suctioned into a recess during the ultrasonic fusion of the film edges, so that the seed cluster is not vibrated or otherwise contacted as part of the fusion process. The resulting seed pillow may include the seed cluster encapsulated in an air-filled pocket between the two water-soluble film layers. This seed pillow may then be shrink-wrapped through heat application to create a compact, durable, shrink-wrapped seed pillow. In this manner, the techniques of the present disclosure may enable efficient, consistent production of seed pillows that avoid the issues present in conventional techniques.

For example, the techniques for producing such seed pillows may include a rotary machine comprising a metal roller (also referenced herein as a "roller") with four milli-meter (mm) half spheres as recesses in the surface and an ultrasonic welding wheel configured to vibrate at a frequency sufficient to fuse the water-soluble film containing a seed cluster. The two layers of film (e.g., polyvinyl alcohol (PVA) film) along with the seed clusters may be rolled onto the roller and suction may be applied from the bottom of the recess to keep the seed cluster in the recess during fusion of the film edges. The film is then squeezed between the roller and the ultrasonic welder wheel, which fuses the two layers of film together, and creates the "pillow" or pocket containing the seed cluster. As a consequence of using the ultrasonic welder wheel, the film fusion/sealing process is nearly instantaneous, and does not require the heat up/down time of conventional heat sealers. Moreover, the ultrasonic welder wheel may eliminate the potential damage to seed clusters as a result of conventional heat sealers applying heat to the seed, thereby damaging and/or completely eliminating the viability of the seed.

Further, as part of this overall seed pillow production process, the seed pillows may receive additional coatings of materials (e.g., fungicides, fertilizer, etc.) after the initial creation of the seed pillow. In fact, the seed pillows of the present disclosure may receive any suitable number of coatings by repeating the process of: (i) placing a coating on the exterior surface of the pillow, (ii) placing a film layer over the coating, (iii) suctioning the seed pillow into the recess, and (iv) squeezing the film layers between the roller and ultrasonic welder to seal the coating to the outside of the pillow. This extra coating process may be repeated any suitable number of times or in any desired order to layer as many coatings on the exterior of the pillow as desired/required/etc. The particular layering of the coatings may also enable more advantageous outcomes (e.g., higher germination/survival rates). For example, certain later-release (e.g., desired for later-release after sowing/seeding in the ground) coatings may be optimally applied closer to the seed cluster, and certain quick-release coatings may be optimally applied further away from the seed cluster (e.g., closer to the external environment).

In any event, when the seed pillows are fully formed and coated, the seed pillows may continue to a cutting process where each individual seed pillow is cut from the film string. The cut seed pillows may then be heat shrink-wrapped to reduce their individual form factors to significantly, such that the shrink-wrapped seed pillows are essentially the size of the seed clusters themselves with a small amount of excess material from the excess film. Generally, this excess material is similar in dimension to the seed cluster and is symmetric around the seed cluster, which increases the sowing capacity/feasibility/ease-of-use of the resulting shrink-wrapped seed pillow.

For example, sowing devices utilized by sowers to plant seeds commonly have spherical/round deposits for the seed clusters. Thus, as the seed clusters diverge from a generally spherical shape, the sowers have a significantly more difficult time sowing these seed clusters in large numbers without experiencing misplaced and/or otherwise improperly sown seeds. The present invention substantially reduces/eliminates these issues by producing a consistent, approximately spherical seed pillow, that enables sowers to achieve more accurate and consistent sowing of such seed clusters, particularly at a large scale.

One exemplary embodiment of the present disclosure may be a seed pillow, comprising: a first water-soluble film; a seed cluster disposed on the first water-soluble film; and a second film that is positioned over the first water-soluble film and the seed cluster, the second film having a first portion that is fused to a second portion of the first water-soluble film from ultrasonic vibrations.

In a variation of this embodiment, the first water-soluble film and the second film are shrink-wrapped around the seed cluster through heat application to the first water-soluble film and the second film for a first period of time. Further in this variation, the second portion of the first water-soluble film and the first portion of the second film have a first diameter of approximately 6 millimeters (mm) prior to the heat application, and the second portion of the first water-soluble film and the first portion of the second film have a second diameter of approximately 4 mm after the heat application. Still further in this variation, the second portion of the first water-soluble film and the first portion of the second film shrink into a pair of shrink-wrapped wings around the seed cluster after the heat application, and the pair of shrink-wrapped wings have a length of approximately 1 mm.

In another variation of this embodiment, an ultrasonic welding wheel vibrates at a frequency to cause the ultrasonic vibrations, and the first water-soluble film and the second film are compressed at a contact point between the ultrasonic welding wheel and a roller to fuse the second portion of the first water-soluble film to the first portion of the second film.

In yet another variation of this embodiment, the seed pillow further comprises: (i) an unfused center of the first water-soluble film and the second film, (ii) a fused outer circumference of the first water-soluble film and the second film, and (iii) the seed cluster disposed within the unfused center.

In still another variation of this embodiment, the first water-soluble film and the second film are comprised of a polyvinyl alcohol (PVA) film.

In yet another variation of this embodiment, the seed pillow further comprises: a third water-soluble film that is positioned over the second film, the third water-soluble film having a third portion that is fused to the first portion of the second film from the ultrasonic vibrations; and a coating that is disposed between the second film and the third water-soluble film. Further in this variation, the coating comprises at least one of: (i) a growth regulator, (ii) a bacteria, (iii) a fungus, (iv) a fungicide, or (v) a fertilizer.

In still another variation of this embodiment, the seed cluster is one seed.

In yet another variation of this embodiment, the seed cluster is a plurality of seeds that are adhered together through application of an adhesive compound prior to disposition on the first water-soluble film.

Another exemplary embodiment of the present disclosure may be a seed pillow, comprising: a first water-soluble film; a seed cluster disposed on the first water-soluble film; a second film that is positioned over the first water-soluble film and the seed cluster, the second film having a first portion that is fused to a second portion of the first water-soluble film from ultrasonic vibrations; a third water-soluble film that is positioned over the second film, the third water-soluble film having a third portion that is fused to the first portion of the second film from the ultrasonic vibrations; and a coating that is disposed between the second film and the third water-soluble film.

In a variation of this embodiment, the first water-soluble film and the second film are shrink-wrapped around the seed cluster through heat application to the first water-soluble film and the second film for a first period of time. Further in this variation, the second portion of the first water-soluble film and the first portion of the second film have a first diameter of approximately 6 millimeters (mm) prior to the heat application, and the second portion of the first water-soluble film and the first portion of the second film have a second diameter of approximately 4 mm after the heat application. Still further in this variation, the second portion of the first water-soluble film and the first portion of the second film shrink into a pair of shrink-wrapped wings around the seed cluster after the heat application, and the pair of shrink-wrapped wings have a length of approximately 1 mm.

In another variation of this embodiment, the seed pillow further comprises: (i) an unfused center of the first water-soluble film and the second film, (ii) a fused outer circumference of the first water-soluble film and the second film, and (iii) the seed cluster disposed within the unfused center.

In yet another variation of this embodiment, the first water-soluble film and the second film are comprised of a polyvinyl alcohol (PVA) film; and the coating comprises at least one of: (i) a growth regulator, (ii) a bacteria, (iii) a fungus, (iv) a fungicide, or (v) a fertilizer.

In still another variation of this embodiment, the seed cluster is a plurality of seeds that are adhered together through application of an adhesive compound prior to disposition on the first water-soluble film.

Yet another exemplary embodiment of the present disclosure is a method for producing seed pillows. The method comprises: depositing a seed cluster on a first water-soluble film that is disposed on a roller; and rotating the roller through a contact point with an ultrasonic welding wheel that is vibrating at a frequency to fuse a first portion of the first water-soluble film to a second portion of a second film without contacting the seed cluster to create a seed pillow.

In a variation of this embodiment, the method further comprises: shrink-wrapping the first water-soluble film and the second film around the seed cluster through heat application to the first water-soluble film and the second film for a first period of time.

In accordance with the above, and with the disclosure herein, the present disclosure includes improvements to other technologies or technical fields at least because the present disclosure describes or introduces improvements to seed packaging (e.g., seed tapes) and the corresponding seed packaging production systems in the seed supply field and the seeding/sowing field. More specifically, the first water-soluble film and second film that is fused via ultrasonic vibrations of the present disclosure improve the production process for seed packaging, by fusing edges of water-soluble film around seeds/seed clusters using high-frequency vibrations while the seeds/seed clusters are safely suctioned into recesses of the roller. Accordingly, the water-soluble films fused through ultrasonic vibration enable efficient and consistent encapsulation of seeds/seed clusters in a seed pillow without requiring potentially harmful heat application, as is typically performed in conventional techniques. The water-soluble films fused through ultrasonic vibration thereby increase the seed/seed cluster security and viability prior to and during sowing by substantially reducing/eliminating the deleterious effects heat application may yield on seeds/seed clusters.

Moreover, the present disclosure includes effecting a transformation or reduction of a particular article to a different state or thing, e.g., transforming or reducing the germination failure rate of seeds/seed clusters from a non-optimal state to an optimal state.

Still further, the present disclosure includes specific features other than what is well-understood, routine, conventional activity in the field, or adding unconventional steps that demonstrate, in various embodiments, particular useful applications, e.g., a first water-soluble film; a seed cluster disposed on the first water-soluble film; and a second film that is positioned over the first water-soluble film and the seed cluster, the second film having edges that are fused to edges of the first water-soluble film from ultrasonic vibrations, wherein the first water-soluble film and the second film are shrink-wrapped around the seed cluster through heat application to the first water-soluble film and the second film for a first period of time.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 5A depicts a flow diagram representing an exemplary method for producing seed pillows, in accordance with various embodiments described herein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Exemplary Systems

Figure 1A:
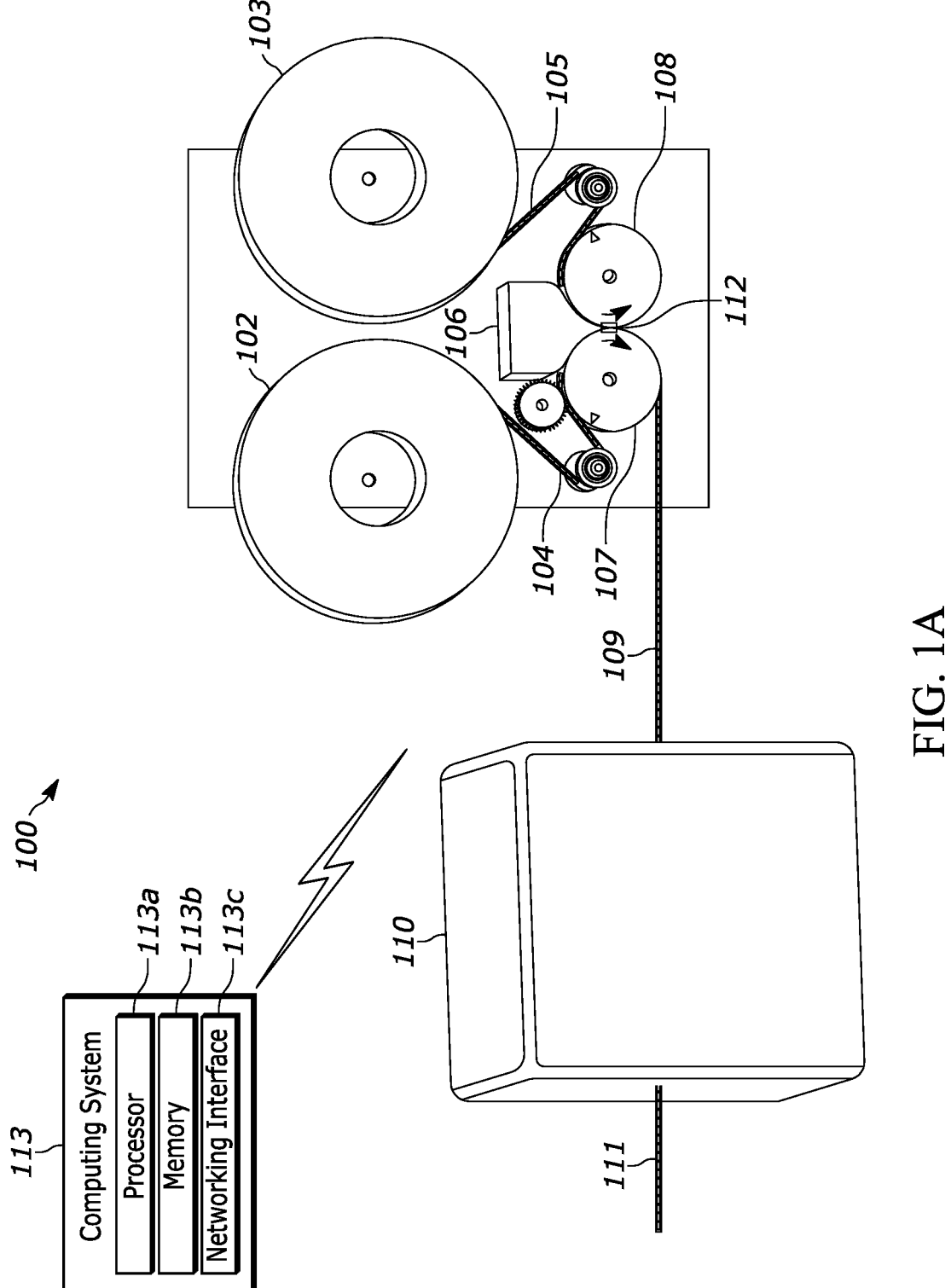
FIG. 1A depicts an exemplary system in which various embodiments of the present disclosure may be implemented.

FIG. 1A depicts an exemplary system 100 in which various embodiments of the present disclosure may be implemented. Generally, the exemplary system 100 is a seed pillow production system configured to produce seed pillows in a manner consistent with various embodiments of the present disclosure. The exemplary system 100 may include multiple water-soluble film rollers 102, 103, two water-soluble film strips 104, 105, a seed hopper 106, a roller 107, an ultrasonic welding wheel 108, a fused film strip 109, a cutter device 110, a cut film strip 111, and a computing system 113.

The first water-soluble film roller 102 and the second film roller 103 may both include multiple layers of a water-soluble film used to create seed pillows. The water-soluble film may be or may include any suitable water-soluble material, such as polyvinyl alcohol (PVA). As illustrated in FIG. 1A, the first water-soluble film roller 102 and the second film roller 103 may rotate to unroll the water-soluble film from the rollers 102, 103. Each of the individual water-soluble film strips 104, 105 unrolled from the first and second film rollers 102, 103 may extend to the roller 107 and the ultrasonic welding wheel 108. Of course, as referenced herein, both the first water-soluble film 104 and the second film 105 may be water-soluble. However, in certain embodiments, the second film 105 may not be water-soluble, and may be configured to fuse together with the first water-soluble film 104 via the ultrasonic welding wheel 108.

In particular, the first water-soluble film 104 may extend from the first water-soluble film roller 102 to the roller 107, and the second film 105 may extend from the second film roller 103 to the ultrasonic welding wheel 108. As discussed further herein, the roller 107 may have a plurality of recesses located on an outer rim of the roller 107. The first water-soluble film 104 may be disposed on the outer rim of the roller 107, such that the strip 104 is also disposed over the plurality of recesses. As the roller 107 rotates, the first water-soluble film 104 may encounter the seed hopper 106. At this point, the seed hopper 106 may release a seed cluster onto the first water-soluble film 104, such that the seed cluster is disposed on the first water-soluble film 104 over a recess in the outer rim of the roller 107. In this manner, the first water-soluble film 104, and by extension, the seed cluster may be suctioned into the recess to avoid contact with the ultrasonic welding wheel 108.

As referenced herein, the "seed cluster" may comprise any suitable number of individual seeds, such that a seed cluster may be or include a single seed and/or multiple seeds. The seed clusters referenced herein may be described in terms of multiple seeds adhered together for the purposes of discussion only, and may simply illustrate an exemplary embodiment of a "seed cluster" being encapsulated into a seed pillow.

In any event, the first water-soluble film 104 may receive the seed cluster from the seed hopper 106, and the second film 105 may enclose the seed cluster between the first water-soluble film 104 and the second film 105. The seed hopper 106 may include a plurality of seed clusters that are sized appropriately and that include the relevant seed(s) for a particular run of seed pillows. For example, the seed clusters stored in the seed hopper 106 may all include seeds that are intended for a particular use-case (e.g., flowers, herbs, salad mixes, etc.). These seed clusters may be produced beforehand, and/or may be fabricated in accordance with other embodiments described herein (e.g., exemplary adhesive application workflow of FIG. 2A). When the seed cluster is deposited on the first water-soluble film 104, the seed cluster may then be enclosed by the second film 105.

As mentioned, the second film 105 may extend from the second film roller 103 to the ultrasonic welding wheel 108, and the ultrasonic welding wheel 108 may vibrate at a frequency that enables the ultrasonic welding wheel 108 to fuse film strips together. In particular, the ultrasonic welding wheel 108 may vibrate at the frequency (e.g., 40 kilohertz (kHz) or 35 kHz), such that the edges of the first water-soluble film 104 and the second film 105 may fuse together. As referenced herein, the edges of the first water-soluble film 104 and/or the second film 105 may include any portion of the strips 104, 105 that are not located over a recess of the outer rim of the roller 107. Additionally, the frequency may be any suitable value that enables the ultrasonic welding wheel 108 to fuse at least two layers of the water-soluble film (e.g., first water-soluble film 104 and second film 105) together. For example, the ultrasonic welding wheel 108 may vibrate at approximately 35 kHz, and/or may vibrate at any frequency within a range of approximately 20 kHz to approximately 70 kHz.

As a result of this vibration, the ultrasonic welding wheel 108 may fuse edges of the first water-soluble film 104 and edges of the second film 105 together without any heat application. The roller 107 also provides suction to the bottom surface of the first water-soluble film 104, and by extension, the seed cluster through the bottoms of the recesses in the outer rim of the roller 107; and this suction prevents the seed cluster from contacting the ultrasonic welding wheel 108 when the portions of the roller 107 outer rim containing recesses reach a contact point (represented generally by the area 112) with the ultrasonic welding wheel 108. Moreover, the ultrasonic welding wheel 108 may be turned on/off nearly instantaneously, such that the wheel 108 only needs to be actively vibrating for a portion of any production run of seed pillows when the roller 107 rotates through the contact point 112 with the ultrasonic welding wheel 108. Taken together, these functional aspects of the ultrasonic welding wheel 108 and roller 107 enable the exemplary system 100 to create seed pillows without damaging the seed clusters from inadvertent heat application and to fuse the film strip edges without requiring the lengthy ramp up/down times commonly required from conventional heat-based fusion devices.

When the roller 107 rotates through the contact point 112 with the ultrasonic welding wheel 108, the roller 107 may release the newly formed seed pillow from the recess by stopping the suction applied to the bottom surface of the first water-soluble film 104. The newly formed seed pillow may then proceed, as part of the fused film strip 109, to the cutter device 110 to be cut from the fused film strip 109. When the seed pillow reaches the cutter device 110, the cutter device 110 may cut the seed pillow from the fused film strip 109, such that the cutter device 110 may output both a plurality of cut seed pillows and the cut film strip 111. The cut film strip 111 may simply include the portions of the first water-soluble film 104 and the second film 105 that are not included in the plurality of cut seed pillows. Generally, the cutter device 110 may be or include any suitable device for cutting/punching the seed pillows from the fused film strip 109, such as a punch, a laser die cutter, and/or any other suitable device or combinations thereof.

In certain embodiments, the exemplary system 100 may be connected to a computing system 113 that is configured to control and/or otherwise inform the operation of the exemplary system 100. Depending on the embodiment, the computing system 113 may control the rotation speed of roller 107 and ultrasonic welding wheel 108, dispensing rate of the seed hopper 106, a vacuum needle (not shown) that is configured to retrieve seed clusters from the seed hopper 106, cutting area of the cutter device 110, types of seed clusters deposited into the seed hopper 106, and/or any other control instructions or combinations thereof. Of course, it should be appreciated that, while the various components of the exemplary system 100 (e.g., seed hopper 106, roller 107, ultrasonic welding wheel 108, cutter device 110, etc.) are illustrated in FIG. 1A as single components, the exemplary system 100 may include multiple (e.g., dozens, hundreds, thousands) of each of the components that are simultaneously connected to the computing system 113 for control at any given time.

Generally speaking, the computing system 113 may receive data corresponding to one or more of the individual components (e.g., seed hopper 106, roller 107, ultrasonic welding wheel 108, cutter device 110) of the exemplary system 100, and may process the data in accordance with one or more sets of instructions contained in memory 113b to output any of the control instructions previously described. The computing system 113 may include one or more processors 113a, one or more memories 113b, and a networking interface 113c. The memory 113b may include various sets of executable instructions that are configured to analyze data received at the computing system 113 to output various control instructions.

More specifically, the computing system 113 may be configured to receive and/or otherwise access data from various devices or components (e.g., ultrasonic welding wheel 108), and may utilize the processor(s) 113a to execute the instructions stored in the memory 113b to analyze and/or otherwise process the received data. As an example, the computing system 113 may receive rotation data from the roller 107 and/or the ultrasonic welding wheel 108 indicating that the contact point 112 does not include a recess on the outer rim of the roller 107. The computing system 113 may utilize the processor(s) 113a to analyze this rotation data and determine that the ultrasonic welding wheel 108 should be turned off (i.e., vibration deactivated). Accordingly, the computing system 113 may generate/transmit a control signal to the ultrasonic welding wheel 108 that causes the wheel 108 to deactivate. When the rotation data indicates that the contact point 112 includes a recess on the outer rim of the roller 107, the computing system 113 may generate/transmit a control signal to the ultrasonic welding wheel 108 that causes the wheel 108 to reactivate (i.e., vibration reactivated) and seal edges of the first water-soluble film 104 to the edges of the second film 105.

More generally, the computing system 113 may be or include a personal computing device of a user, such as a smartphone, a tablet, smart glasses, or any other suitable device or combination of devices (e.g., a smart watch plus a smartphone). In some embodiments, the computing system 113 may be or include computing servers and/or combinations of multiple servers storing data that may collectively and/or independently analyze data from the exemplary system 100 to generate control instructions. The computing system 113 may communicate with the components of the exemplary system 100 via USB, Bluetooth, Wi-Fi Direct, Near Field Communication (NFC), and/or any other suitable communication protocol or combinations thereof. For example, the computing system 113 may transmit a control instruction to the components of the exemplary system 100 via the networking interface 113c.

The processors 113a may include any suitable number of processors and/or processor types. For example, the processors 113a may include one or more CPUs and one or more graphics processing units (GPUs). The memories 113b may include one or more persistent memories (e.g., a hard drive and/or solid state memory) and may store one or more applications, modules, and/or models configured to analyze data corresponding to the exemplary system 100 and generate control instructions.

The networking interface 113c may enable the computing system 113 to communicate with the exemplary system 100 and/or any other suitable devices/components or combinations thereof. More specifically, the networking interface 113c may enable the computing system 113 to communicate with each component of the exemplary system 100 across a network (not shown). The networking interface 113c may support wired or wireless communications, such as USB, Bluetooth, Wi-Fi Direct, Near Field Communication (NFC), etc. The networking interface 113c may also enable the computing system 113 to communicate with the various components of the exemplary system 100 via a wireless communication network such as a fifth-, fourth-, or third-generation cellular network (5G, 4G, or 3G, respectively), a Wi-Fi network (802.11 standards), a WiMAX network, a wide area network (WAN), a local area network (LAN), etc.

It will be understood that the above disclosure is one example and does not necessarily describe every possible embodiment. As such, it will be further understood that alternate embodiments may include fewer, alternate, and/or additional steps or elements.

Figure 1B:
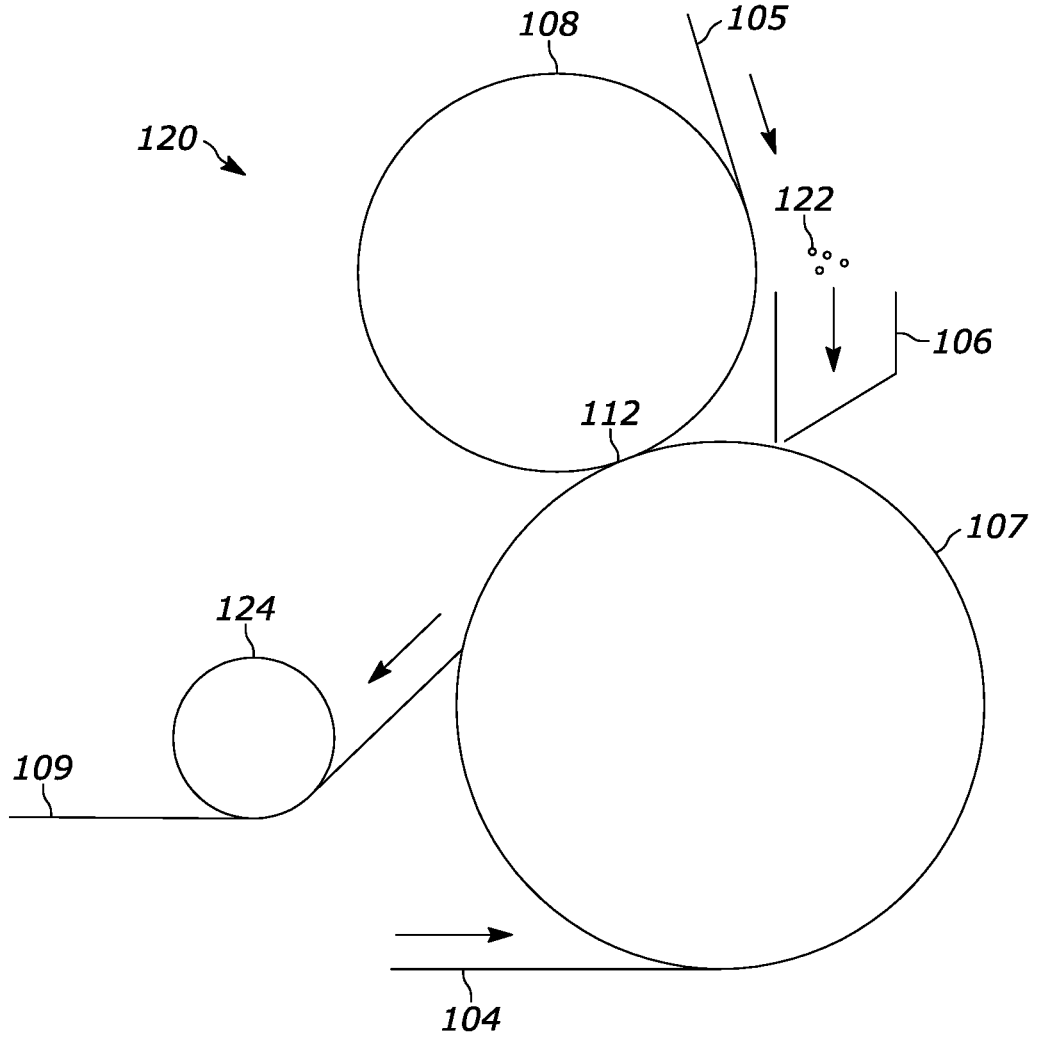
FIG. 1B depicts another exemplary system in which various embodiments of the present disclosure may be implemented.

For example, FIG. 1B depicts another exemplary system 120 in which various embodiments of the present disclosure may be implemented. The exemplary system 120 includes the first water-soluble film 104, the second film 105, the seed hopper 106, the roller 107, and the ultrasonic welding wheel 108. However, in the exemplary system 120, both the ultrasonic welding wheel 108 and the seed hopper 106 are disposed above the roller 107.

In this configuration, a user or an automated system component may place seed clusters 122 into the seed hopper 106, which may release the seed clusters 122 onto the first water-soluble film 104. In certain embodiments, the seed hopper 106 may include additional components that enable the seed hopper 106 to automatically release seed clusters onto the first water-soluble film 104. For example, the seed hopper 106 may include an automatic gate mechanism that is configured to open/shut quickly, as well as an imaging system or other system configured to identify that a single seed cluster has passed through the automatic gate mechanism. When the imaging system makes such a determination, the seed hopper 106 may close the automatic gate mechanism to prevent additional seed clusters from releasing onto the first water-soluble film 104.

Figure 2A:
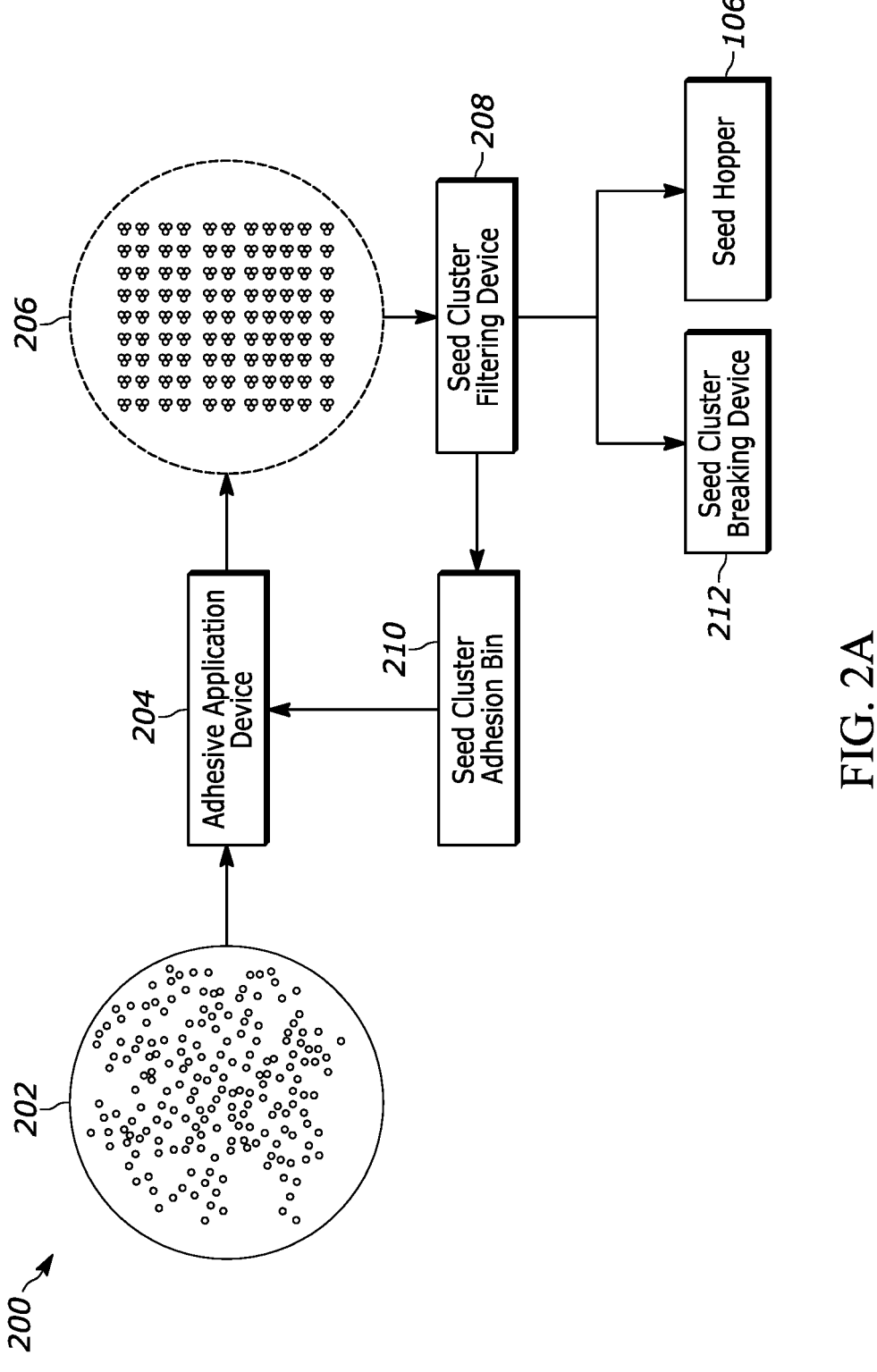
FIG. 2A depicts an exemplary adhesive application workflow, in accordance with various embodiments described herein.
Figure 2B:
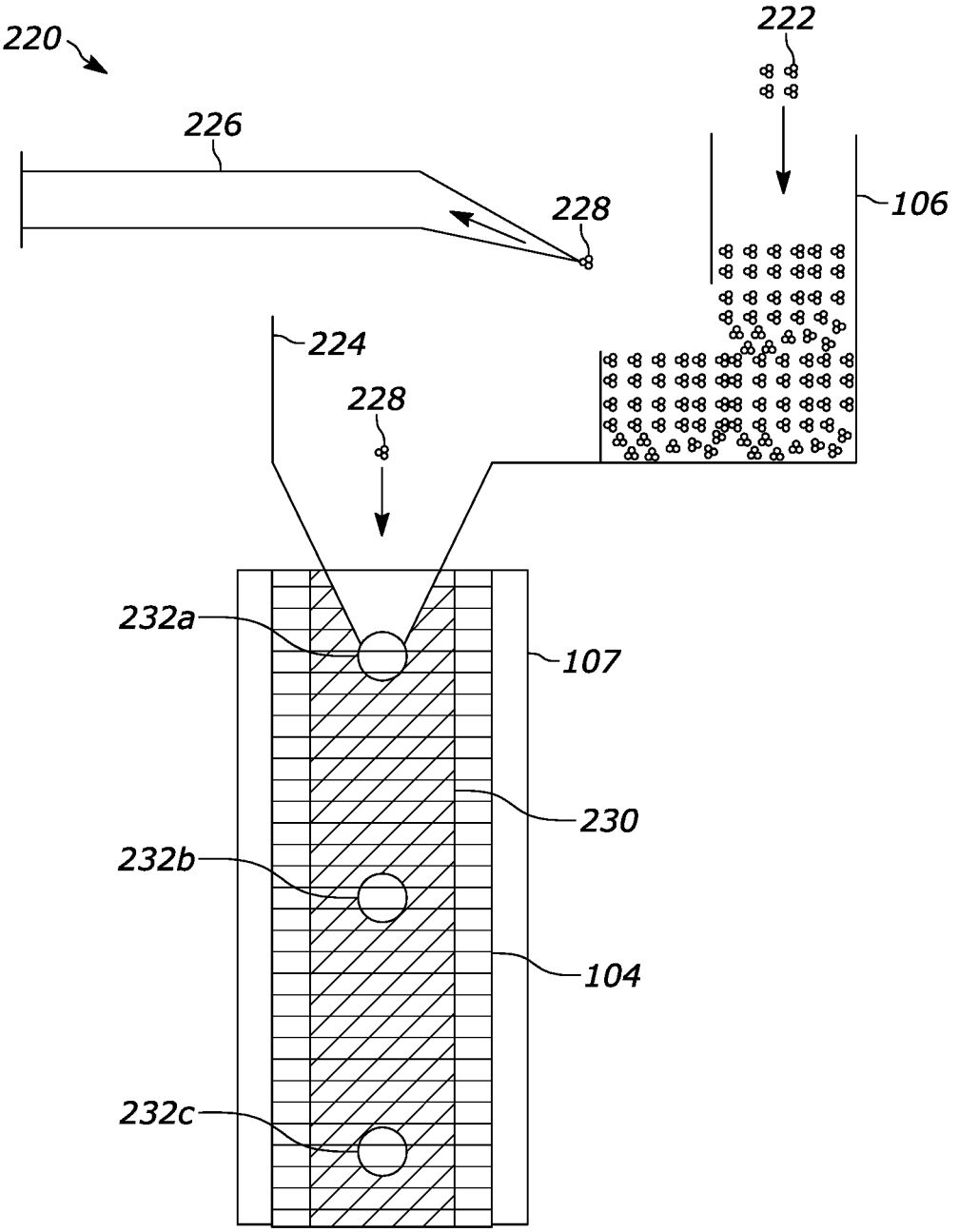
FIG. 2B depicts an exemplary vacuum needle depositing a seed cluster from a hopper onto water-soluble film disposed on the roller, in accordance with various embodiments described herein.

Additionally or alternatively, and as illustrated in FIG. 2B, the seed hopper 106 may also include a distribution channel 224 that is configured to position seed clusters 122 onto the first water-soluble film 104. In these configurations, the exemplary system 120 may further include a vacuum needle 226 configured to apply suction through the tip of the vacuum needle 226 to the seed clusters 228 located within the seed hopper 106. The vacuum needle 226 may then move the suctioned seed cluster 228 over the distribution channel 224, and may release the seed cluster 228 into the distribution channel 224 for release onto the first water-soluble film 104.

Regardless, the roller 107 may apply suction to the bottom surface of the first water-soluble film 104, such that the first water-soluble film 104 and the seed cluster 122 may be suctioned into a recess prior to reaching the contact point 112 between the roller 107 and the ultrasonic welding wheel 108. The edges of the first water-soluble film 104 and the second film 105 may then be squeezed and fused by the roller 107 and the ultrasonic welding wheel 108 to create a seed pillow. The roller 107 may then stop applying suction to the newly formed seed pillow, and the seed pillow may proceed around the secondary roller 124 to proceed to a cutting device (e.g., cutter device 110).

Exemplary Seed Cluster Preparation and Seed Pillow Production

FIG. 2A depicts an exemplary adhesive application workflow 200, in accordance with various embodiments described herein. Generally, the exemplary adhesive application workflow 200 represents a seed cluster formation process that may be utilized by the embodiments of the present disclosure. Namely, the output seed clusters 206 may be input into a seed hopper (e.g., seed hopper 106) and released/placed onto a first water-soluble film strip (e.g., first water-soluble film 104) for encapsulation into a seed pillow, in accordance with the embodiments described herein. Of course, in certain applications, the individual seeds 202 may not require adhesion to additional individual seeds, such that the individual seeds 202 may be input into the seed hopper 106 for release/placement onto the first water-soluble film 104 for encapsulation into a seed pillow, in accordance with the embodiments described herein. Regardless, in instances where multiple individual seeds 202 are desired for inclusion in each seed pillow, individual seeds 202 may be adhered to other individual seeds into a cluster of multiple seeds.

To achieve this adhesion, the individual seeds 202 may be placed into an adhesive application device 204. The adhesion application device 204 may apply an adhesive to the individual seeds 202, and the seed cluster filtering device 208 may filter the individual seeds 202 with the applied adhesive in a manner that causes the resulting seed clusters 206 to include the desired number/types of seeds. For example, the seed cluster filtering device 208 may include gratings of various sizes that only allow seed clusters 206 of certain desired sizes to fall through, and thereby be included in the set of seed clusters 206 that are placed in the seed hopper 106.

The remaining seed clusters 206 that fail to pass through the seed cluster filtering device 208 may be transferred to one of two potential locations—the seed cluster adhesion bin 210 or the seed cluster breaking device 212. The seed cluster adhesion bin 210 may be a storage location for seed clusters that are too small, do not include all necessary seed types, and/or otherwise require additional adhesive to satisfy the requirements for a particular run of seed pillow production. The seed cluster adhesion bin 210 may thus feed the insufficiently sized seed clusters into the adhesive application device 204 for reapplication of the adhesive, and a reintroduction of the individual seeds 202 to increase the size/seed types of the seed clusters for eventual placement into the seed hopper 106.

For example, a first production run of seed pillows may involve seed clusters that are intended to include three individual seeds 202 that are of three different seed types (e.g., a salad greens seed mix). After an initial flow through the adhesive application device 204 a small percentage of the output seed clusters 206 may only have two individual seeds (e.g., of two seed types), such that these small output seed clusters 206 are not ready for placement in the seed hopper 106. To remedy this situation, the seed cluster filtering device 208 may pass the small output seed clusters 206 into the seed cluster adhesion bin 210, where the small output seed clusters 206 pass through the adhesive application device 204 for a second time. The small output seed clusters 206 may receive a second coat of adhesive, and may adhere to the third individual seed type required for the first production run. The now appropriately sized/configured output seed clusters 206 may pass through the seed cluster filtering device 208 and into the seed hopper 106.

Conversely, the seed cluster breaking device 212 may be a device that is configured to break any oversized output seed clusters 206 into smaller and/or individual seed clusters. Namely, the seed cluster breaking device 212 may be a device configured to reduce the size of seed clusters that are too large, do not include all necessary seed types, and/or otherwise require modification to satisfy the requirements for a particular run of seed pillow production. To reduce the size of the oversized output seed clusters 206 without damaging the seeds themselves can be difficult, and as a result, the seed cluster breaking device 212 may gently break the oversized output seed clusters 206 into smaller clusters or individual seeds. Thus, the seed cluster breaking device 212 may be or include a vibrating/shaking belt, a rotating/vibrating/shaking drum, and/or any other suitable device that may gently break apart the oversized output seed clusters 206 into smaller clusters or individual seeds.

In the event that the seed cluster breaking device 212 breaks an oversized output seed cluster 206 into the appropriate size for a particular production run of seed pillows, then those seed clusters 206 may be placed directly into the seed hopper 106. However, the seed cluster breaking device 212 may occasionally break an oversized output seed cluster 206 back into individual seeds, and those individual seeds may require a subsequent pass through the adhesive application device 204. Accordingly, the seed cluster breaking device 212 may pass individual seeds and/or seed clusters that are otherwise too small into the seed cluster adhesion bin 210 for reintroduction into the adhesive application device 204.

As an example, a second production run of seed pillows may involve seed clusters that are intended to include two individual seeds 202 that are of two different seed types (e.g., a flower mix). After an initial flow through the adhesive application device 204 a small percentage of the output seed clusters 206 may have three or four individual seeds, such that these oversized output seed clusters 206 are not ready for placement in the seed hopper 106. To remedy this situation, the seed cluster filtering device 208 may pass the oversized output seed clusters 206 into the seed cluster breaking device 212, where the oversized output seed clusters 206 are broken into smaller clusters or individual seeds. The seed clusters that are broken into the required size and with the required seed types may pass directly into the seed hopper 106. The seed clusters that are broken into individual seeds may be passed into the seed cluster adhesion bin 210. Those seed clusters may be reintroduced into the adhesive application device 204, receive a second coat of adhesive, and may adhere to the other individual seed type required for the second production run. The now appropriately sized/configured output seed clusters 206 may pass through the seed cluster filtering device 208 and into the seed hopper 106.

Of course, the output seed clusters 206 may pass through the seed cluster filtering device 208, the seed cluster adhesion bin 210, the adhesive application device 204, and/or the seed cluster breaking device 212 any suitable number of times prior to passing into the seed hopper 106 to ensure that the output seed clusters 206 have the appropriate number/type of individual seeds required for a particular production run of seed pillows.

Moreover, in certain embodiments, the adhesive application, filtering, breaking, and/or any other actions performed by the components of the exemplary adhesive application workflow 200 may be controlled by the computing system 113. For example, the computing system 113 may generate control instructions that cause the adhesive application device 204 to apply/spray the adhesive onto the input individual seeds 202. The computer system 113 may then also generate/transmit control instructions that cause the motor to actuate the seed cluster filtering device 208 to filter the output seed clusters 206 into the seed hopper 106, the seed cluster adhesion bin 210, and/or the seed cluster breaking device 212.

FIG. 2B depicts an exemplary vacuum needle 226 depositing a seed cluster 228 from a seed hopper 106 onto a first water-soluble film 104 disposed on the roller 107, in accordance with various embodiments described herein. In particular, FIG. 2B illustrates an exemplary seed cluster deposit sequence 220 where seed clusters 222 in the seed hopper 106 are suctioned into a tip of the vacuum needle 226 and released into the distribution channel 224 for placement onto the first water-soluble film 104. The roller 107 also includes an outer rim 230 that has multiple recesses 232a, 232b, 232c that may pass under the distribution channel 224 as the roller 107 rotates in a direction that causes the top of the roller 107 in FIG. 2B to move in a direction into the page. In other words, the roller 107 may rotate in a direction that causes the first recess 232a to pass under the distribution channel 224 before the second recess 232b, and the second recess 232b may pass under the distribution channel 224 before the third recess 232c.

The first water-soluble film 104 may be disposed over the roller 107. More specifically, the first water-soluble film 104 may be disposed over at least the outer rim 230 of the roller 107, so that the first water-soluble film 104 may also be disposed over the recesses 232a, 232b, 232c. The outer rim 230 may also include a surface texture (indicated by the patterning in the outer rim 230) that maintains the position of the first water-soluble film 104 over the recesses 232a, 232b, 232c to avoid the film 104 moving during production of the seed pillows. However, in certain embodiments, the outer rim 230 may not include a surface texture, and the exterior surface of the roller 107 may simply be a uniform surface that includes recesses. Moreover, each recess 232a-c may generally be a half-sphere with a 4 mm diameter and a 2 mm depth extending from the outer rim 230 toward a center of the roller 107.

In any event, the exemplary seed cluster deposit sequence 220 shows the seed clusters 222 being deposited into the seed hopper 106. For example, the seed clusters 222 may be deposited into the seed hopper 106 from the seed cluster filtering device 208 after satisfying the requirements for the seed pillow production run. These seed clusters 222 may fill the seed hopper 106, and the vacuum needle 226 may be configured to actuate into the seed hopper 106. When the vacuum needle 226 actuates into the seed hopper 106, the vacuum needle 226 may apply suction through the tip of the vacuum needle 226 to suction a seed cluster 228 into the tip.

Thereafter, the vacuum needle 226 may actuate away from the seed hopper 106 while maintaining suction on the seed cluster 228. When the vacuum needle 226 moves over the distribution channel 224, the vacuum needle 226 may stop applying suction to the seed cluster 228, and may thereby release the seed cluster 228 into the distribution channel 228. The seed cluster 228 may then fall into the distribution channel 228, where the seed cluster 228 may be released onto the first water-soluble film 104 over a recess 232a, 232b, 232c.

In certain embodiments, the actuation, suction, and/or any other actions performed by the vacuum needle 226 may be controlled by the computing system 113. For example, the computing system 113 may generate control instructions that cause a motor connected to the vacuum needle 226 to actuate the vacuum needle 226 into the seed hopper 106 that enables the vacuum needle 226 to suction the seed cluster 228 into the tip of the vacuum needle 226. The computer system 113 may then also generate/transmit control instructions that cause the motor to actuate the vacuum needle away from the seed hopper 106 while maintaining suction on the seed cluster 228, and/or to cause the vacuum needle to stop applying suction on the seed cluster 228 to release the seed cluster into the distribution channel 224.

Regardless, when the seed cluster 228 is released into the distribution channel 224, the seed cluster 228 may be placed onto the first water-soluble film 104. In particular, as illustrated in FIG. 2B, the seed cluster 228 may pass through the distribution channel 224 and be received on the first water-soluble film 104 over the recess 232a in the outer rim 230 of the roller 107. When the seed cluster 228 contacts the first water-soluble film 104, the roller 107 may apply suction through the bottom of the recess 232a to pull the first water-soluble film 104 and the seed cluster 228 into the recess 232a prior to reaching the contact point (e.g., contact point 112) with an ultrasonic welding wheel (e.g., ultrasonic welding wheel 108).

Additionally, or alternatively, the exemplary seed cluster deposit sequence 220 may also include a seeding drum (not shown) that receives seed clusters from the seed hopper 106 and deposits them onto individual recesses of the roller 107. Namely, the seeding drum may have a plurality of recesses and may be configured to: receive seed clusters from the seed hopper 106, and apply suction to seed clusters received from the seed hopper 106 through the recesses of the seeding drum. The seeding drum may then rotate each recess over a corresponding recess of the plurality of recesses in the roller 107, and may stop the suction to release the seed cluster(s) contained in the recess onto the first water-soluble film 104 disposed on the corresponding recess in the roller 107.

Figure 2C:
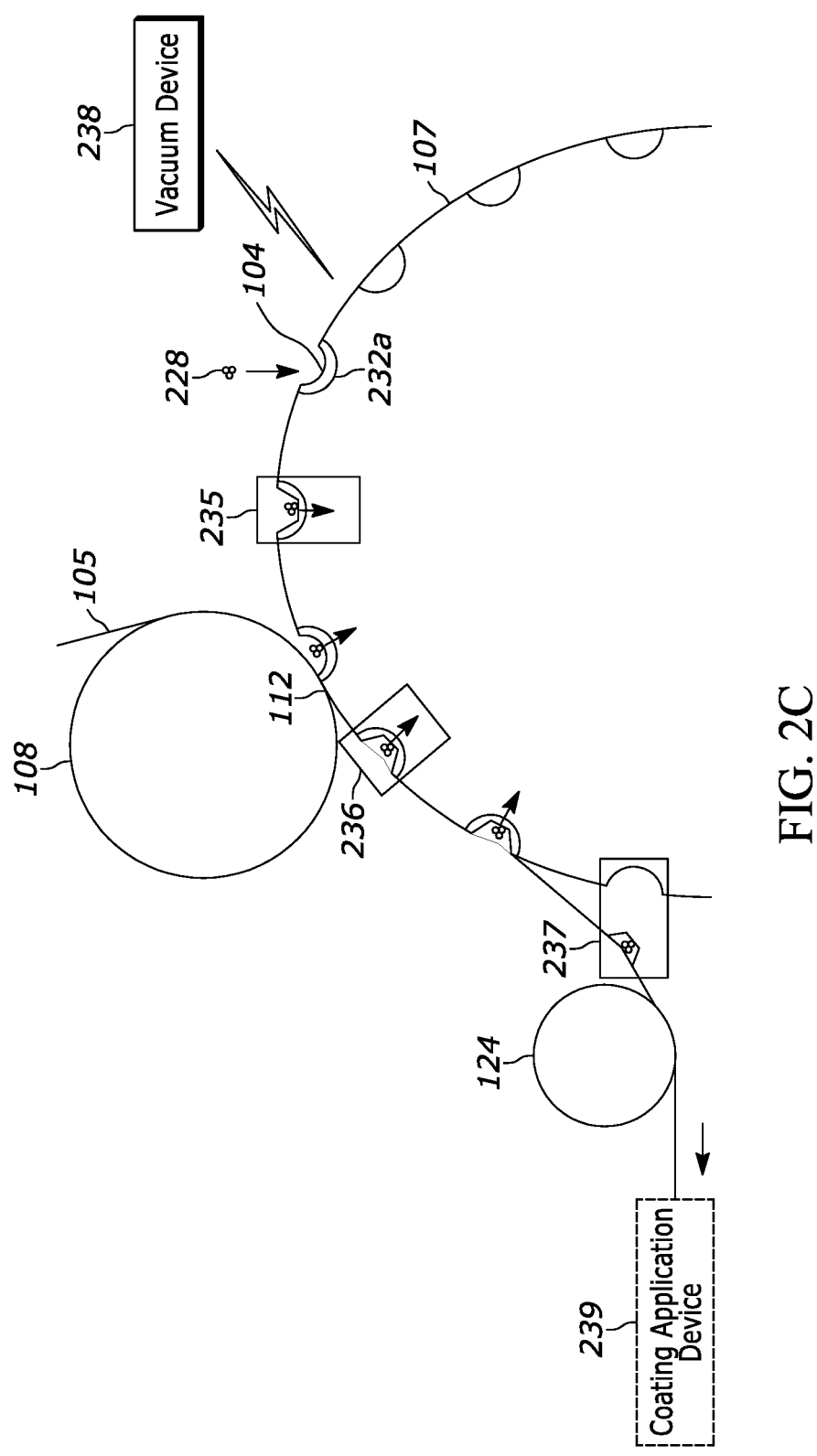
FIG. 2C depicts an ultrasonic welding wheel contacting the roller to fuse edges of the water-soluble film together while the seed cluster is suctioned into a recess, in accordance with various embodiments described herein.

To provide a better understanding of the suction and fusion process, FIG. 2C depicts an ultrasonic welding wheel 108 contacting the roller 107 to fuse edges of the water-soluble film 104, 105 together while the seed cluster 228 is suctioned into a recess 232a, in accordance with various embodiments described herein. The seed cluster 228 may be placed onto the first water-soluble film 104 through, for example, the distribution channel 224 of FIG. 2B. In particular, the seed cluster 228 may be positioned on the first water-soluble film 104 that is disposed over the recess 232a in the outer rim (e.g., outer rim 230) of the roller 107.

When the seed cluster 228 is positioned on the first water-soluble film 104, the roller 107 may apply suction (indicated by the arrow in box 235) to a bottom surface of the first water-soluble film 104 to pull the first water-soluble film 104 and the seed cluster 228 into the recess 232a. This application of suction may be triggered by the roller 107 based on a rotational position of the roller, a detection of the seed cluster 228 on the first water-soluble film 104, and/or any other suitable determination or combinations thereof. For example, the roller 107 may rotate such that the recess 232a is oriented as illustrated in the box 235. At this orientation, the roller 107 may automatically begin applying suction to the bottom surface of the first water-soluble film 104 through a hole (not shown) at the bottom of the recess 232a. The hole may be connected to a vacuum device 238 configured to produce suction sufficient to pull the first water-soluble film 104 and the seed cluster 228 into the recess 232a without damaging the first water-soluble film 104 or the seed cluster 228.

With the seed cluster 228 and the first water-soluble film 104 suctioned into the recess 232a, the roller 107 may rotate through the contact point 112 with the ultrasonic welding wheel 108. The ultrasonic welding wheel 108 may vibrate at the frequency, and may thereby fuse the edges of the first water-soluble film 104 to the edges of the second film 105. As previously mentioned, the ultrasonic welding wheel 108 is only able to fuse the first water-soluble film 104 to the second film 105 at the contact point 112 because ultrasonic fusing requires the two films 104, 105 to be squeezed between two surfaces (at least one of which is vibrating). Thus, the only fusion is achieved at the contact point 112, which leaves the remainder of the first water-soluble film 104 and the second film 105 currently on the roller 107 and the ultrasonic welding wheel 108, respectively, unaffected by the vibrations of the ultrasonic welding wheel 108. In this manner, the ultrasonic welding wheel 108 further improves over conventional fusing techniques by enabling a highly controllable and containable fusion process that conventional heat application fusion is simply unable to achieve.

In any event, when the roller 107 passes through the contact point 112, the seed cluster 228 is thereafter contained within a seed pillow formed from the first water-soluble film 104 and the second film 105. As illustrated in box 236, the first water-soluble layer 104 and the seed cluster 228 may remain suctioned into the recess 232a by the roller 107 and/or the vacuum device 238 communicatively coupled with the roller 107. Moreover, at box 236, the seed cluster 228 may be completely contained within a newly formed seed pillow as a result of fusing the edges of the first water-soluble film 104 with the edges of the second film 105. Thus, as illustrated in box 236, the edges of the water-soluble films 104, 105 may be fused by the ultrasonic welding wheel 108, and the portions of the water-soluble films 104, 105 that are disposed over the recess 232a may remain unaffected. These unaffected portions of the water-soluble films 104, 105 create the pocket or seed pillow in which the seed cluster 228 is contained.

The roller 107 may continue to rotate until the roller 107 reaches the rotation state illustrated in box 237. At this point, the roller 107 and/or the vacuum device 238 may stop applying suction to the recess 232a, and as a result, the seed pillow may be released from the recess 232a. The seed pillow may proceed to travel under the secondary roller 124 and away from the roller 107 towards, for example, a cutting device (e.g., cutter device 110) that may cut the seed pillow from the fused film strip.

However, in certain instances, the particular seed pillows produced during a production run may require coatings of various types (e.g., growth regulators, beneficial bacterias/fungi, fungicide, fertilizer, etc.) to be applied to each individual seed pillow. In these instances, the fused film strip may simply proceed to a holding area until each initial seed pillow is formed. After the initial formation of each seed pillow, the fused film strip may be placed back into the roller 107, a coating application device 239 may apply a coating to the top and/or bottom surface of the seed pillow, and the coated seed pillow may pass through the contact point with the ultrasonic welding wheel 108 to apply a second layer of the second film 105 to seal in the coating.

Additionally or alternatively, the fused film strip may proceed to a subsequent roller assembly (similar to roller 107 and ultrasonic welding wheel 108) through the coating application device 239. The coating application device 239 may apply the coating(s) to the top and/or bottom surface of the seed pillows, and a third water-soluble film may be positioned over the second film such that the coating is disposed between the second film and the third water-soluble film. The roller/ultrasonic welding wheel may then seal in the coating(s) as part of the seed pillow by fusing edges of the third water-soluble film to edges of the second film. In certain embodiments, the coating application device 239 may apply the coating(s) to the seed pillow after the seed pillow is cut from the seed tape and before/after the seed pillow is shrink-wrapped via heat application.

Figure 2D:
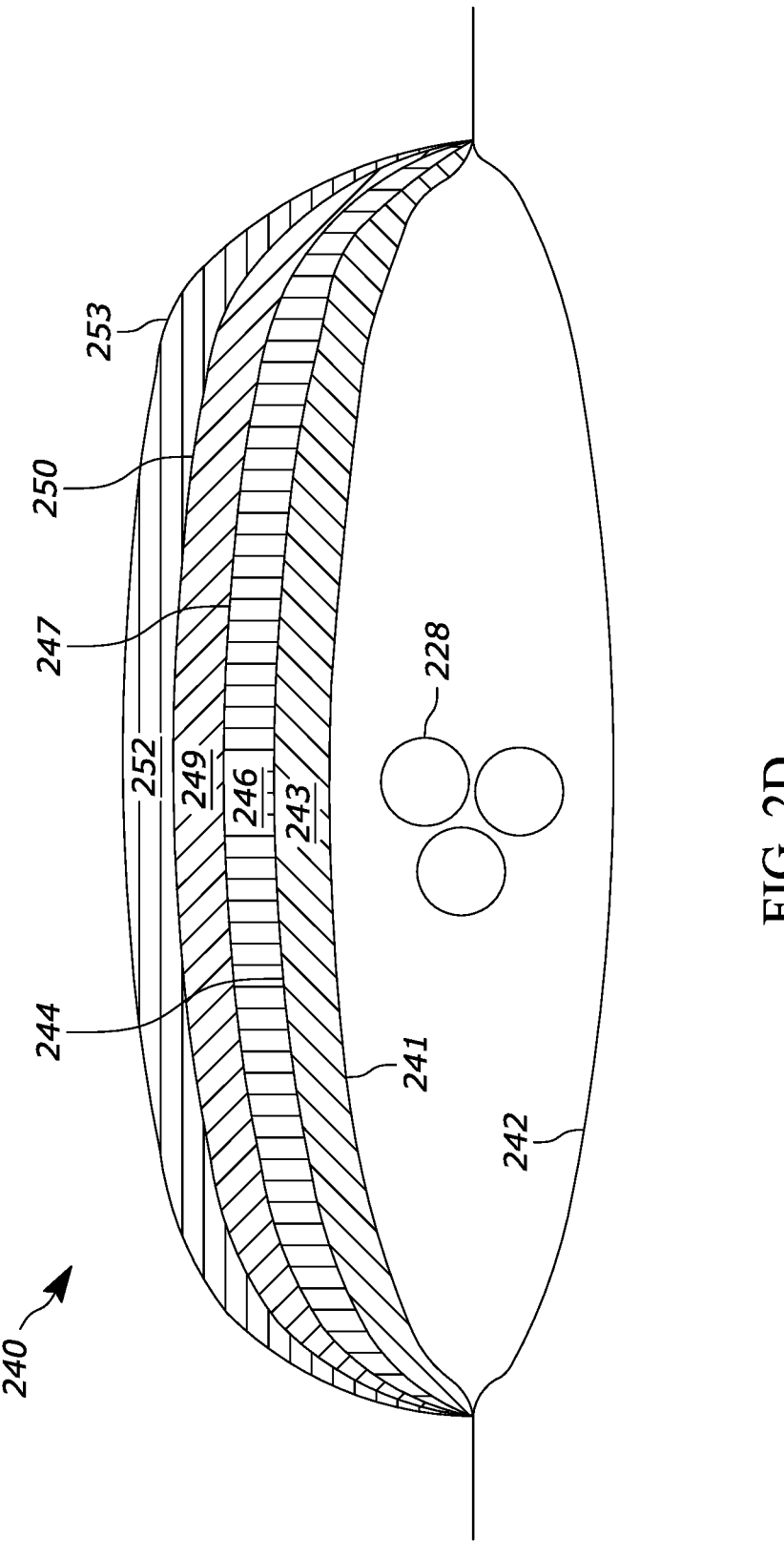
FIG. 2D is a cross-sectional view of an exemplary seed pillow that has received multiple coatings, in accordance with various embodiments described herein.

To illustrate the coatings applied to individual seed pillows, FIG. 2D is a cross-sectional view of an exemplary seed pillow 240 that has received multiple coatings 243, 246, 249, 252, in accordance with various embodiments described herein. The exemplary seed pillow 240 includes four additional layers 244, 247, 250, 253 in addition to the original bottom layer 242 and the original top layer 241. Each of the four coatings 243, 246, 249, 252 may be or include any suitable coating that may provide some benefit or otherwise serve some purpose related to the viability of the seed cluster 228 contained within the exemplary seed pillow 240. For example the four coatings 243, 246, 249, 252 may be or include growth regulators, beneficial bacterias/fungi, fungicide, fertilizer, and/or any other suitable compounds or combinations thereof. Of course, the seed pillows of the present disclosure may include any suitable number of additional layers, and may correspondingly have any suitable number of applied coatings.

As previously mentioned, the seed pillow 240 may have passed through multiple rounds of the ultrasonic welding process described herein to fuse each additional layer 244, 247, 250, 253 to the original top layer 241. Namely, the exemplary seed pillow 240 may have received a first coating 243 after the exemplary seed pillow 240 was formed with just the original top layer 241, the original bottom layer 242, and the seed cluster 228. The exemplary seed pillow 240 may have then passed through another contact point (e.g., contact point 112) between a roller (e.g., roller 107) and an ultrasonic welding wheel (e.g., ultrasonic welding wheel 108) to fuse the edges of the first additional layer 244 to the edges of the original top layer 241. This fusing of the edges of the first additional layer 244 to the edges of the original top layer 241 may seal the first coating 243 between the first additional layer 244 and the original top layer 241.

The exemplary seed pillow 240 may then have received a second coating 246 after the exemplary seed pillow 240 was formed with the original top layer 241, the original bottom layer 242, the seed cluster 228, the first coating 243, and the first additional layer 244. The exemplary seed pillow 240 may have then passed through yet another contact point (e.g., contact point 112) between a roller (e.g., roller 107) and an ultrasonic welding wheel (e.g., ultrasonic welding wheel 108) to fuse the edges of the second additional layer 247 to the edges of the first additional layer 244. This fusing of the edges of the first additional layer 244 to the edges of the second additional layer 247 may seal the second coating 246 between the first additional layer 244 and the second additional layer 247.

This process may continue for each of the third coating 249 and the fourth coating 252, so that the exemplary seed pillow 240 reaches the form illustrated in FIG. 2D. Moreover, the exemplary seed pillow 240 may continue receiving coatings and additional layers of water-soluble film as necessary, based on the requirements of a particular seed pillow production run. For example, a first production run may require the resulting seed pillows to have the four particular coatings 243, 246, 249, 252 (and corresponding additional layers 244, 247, 250, 253) illustrated in FIG. 2D. Continuing this example, a second production run may require the resulting seed pillows to have no additional coatings or layers, and a third production run may require the resulting seed pillows to have one additional coating and a corresponding additional layer.

Additionally, or alternatively, the exemplary seed pillow 240 may also have coatings and/or additional water-soluble film layers applied to the bottom of the exemplary seed pillow 240. In other words, coatings and/or additional water-soluble film layers may be applied on top of one or both of the original top layer 241 and/or the original bottom layer 242. In this manner, the exemplary seed pillow 240 may include coatings 243, 246, 249, 252 and/or any other coatings on either side of the seed pillow 240 to optimize the efficacy of the coatings 243, 246, 249, 252 regardless of sowing/planting errors. As an example, the coating 243 may need to be oriented below the seed cluster at the time of sowing to optimize the efficacy of the coating 243. To ensure that the coating 243 will likely be below the seed cluster 228 at the time of sowing, the coating 243 may be applied to both the top (i.e., above the original top layer 241) and the bottom (i.e., below the original bottom layer 242) of the exemplary seed pillow 240. Thus, such an application strategy may ensure that the coating is oriented below the seed cluster when the seed pillow 240 is sown regardless of whether or not the sower checks that the seed pillow 240 is oriented appropriately prior to sowing.

Further, these coatings 243, 246, 249, 252 may also be organized in a manner that is consistent with the particular goals of the particular seed pillow production run upon sowing/planting of the seed pillows. For example, a first production run may intend to produce seed pillows with two coatings—a first, quick-release coating and a second, longer-release coating. Based on these production objectives, the systems of the present disclosure may structure the resulting seed pillows to position the first, quick-release coating closer to the exterior of the seed pillow than the second, longer-release coating. This structure may result in the system applying the second, longer-release coating as a first additional layer to the seed pillow (e.g., similar to the first coating 243 and first additional layer 244), and the first, quick-release coating as a second additional layer to the seed pillow (e.g., similar to the second coating 246 and second additional layer 247). In this manner, when the resulting seed pillows are sown, the water-soluble film encasing the first, quick-release coating may dissolve first, thereby exposing/releasing the first, quick-release coating into the surrounding soil. Afterwards, the water-soluble film encasing the second, longer-release coating may dissolve, thereby exposing/releasing the second, quick-release coating into the surrounding soil.

Exemplary Seed Pillow Cutting and Individual Seed Pillows

Figure 3A:
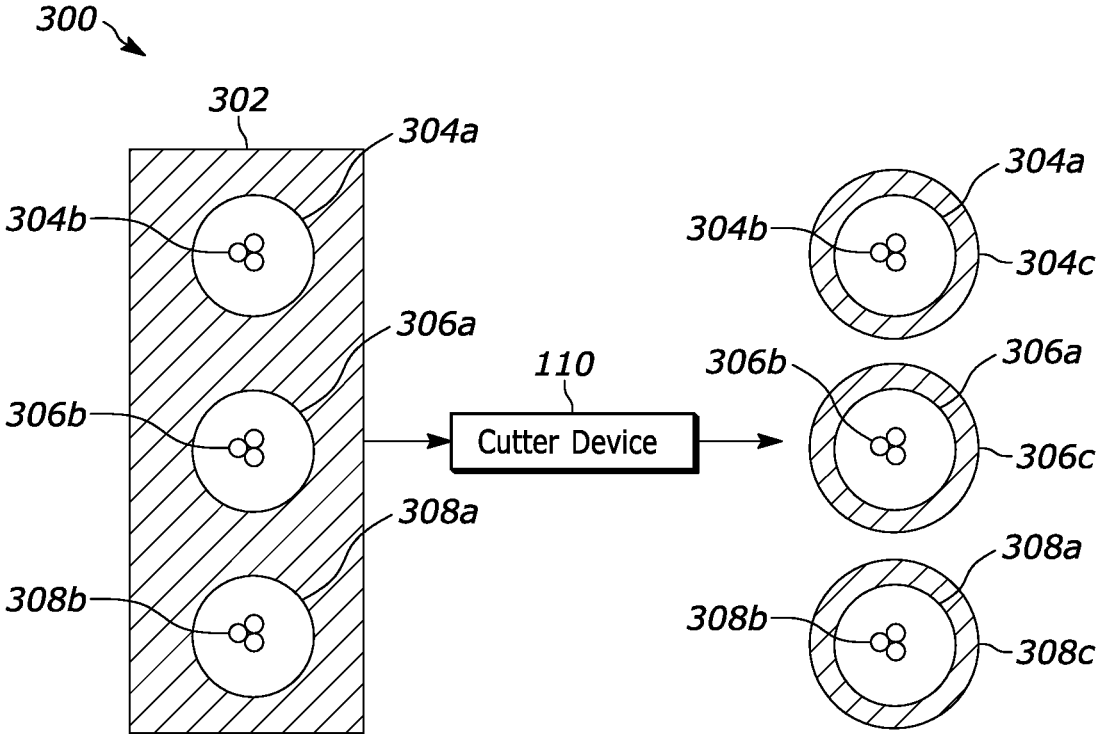
FIG. 3A illustrates an exemplary laser die cutter cutting individual seed pillows from a fused film strip, in accordance with various embodiments described herein.

FIG. 3A illustrates an exemplary cutter device 110 cutting individual seed pillows from a fused film strip 302, in accordance with various embodiments described herein. The fused film strip 302 may comprise a first water-soluble film (e.g., first water-soluble film 104) and a second film (e.g., second film 105) that have been fused together as a result of passing through the contact point (e.g., contact point 112)

between a roller (e.g., roller 107) and an ultrasonic welding wheel (e.g., ultrasonic welding wheel 108). In certain embodiments, the ultrasonic welding wheel may be turned on/off after fusing each individual seed pillow 304a, 306a, 308a, such that the fused film strip 302 may include non-fused portions of the water-soluble films between the individual seed pillows 304a, 306a, 308a.

In any event, the fused film strip 302 may exit the roller in the form illustrated in FIG. 3A, where each individual seed pillow 304a, 306a, 308a includes a seed cluster 304b, 306b, 308b. The systems of the present disclosure may then transfer the fused film strip 302 into the cutter device 110, which receives the fused film strip 302 from the roller and cuts each of the individual seed pillows 304a, 306a, 308a from the fused film strip 302. The cutter device 110 may be configured to cut each of the seed pillows 304a, 306a, 308a from the fused film strip 302, such that each seed pillow 304a, 306a, 308a includes a portion of the fused film strip as an outer circumference 304c, 306c, 308c of the seed pillow 304a, 306a, 308a.

As previously mentioned, the outer circumference 304c, 306c, 308c of the seed pillows 304a, 306a, 308a (and/or other fused portion(s) of seed pillows described herein) may also be referenced herein as an edge of the seed pillows 304a, 306a, 308a. Additionally, and as previously mentioned, the exemplary cutter device 110 may be or include any suitable device for cutting/punching the seed pillows from the fused film strip 302, such as a punch, a laser die cutter, and/or any other suitable device or combinations thereof.

More specifically, each individual seed pillow 304a, 306a, 308a cut from the fused film strip 302 may include fused portions of the first water-soluble film and the second film that extend beyond the unfused portions of the seed pillows 304a, 306a, 308a. For example, the first seed pillow 304a may include a first fused outer circumference 304c, the second seed pillow 306a may include a second fused outer circumference 306c, and the third seed pillow 308a may include a third fused outer circumference 308c.

The fused outer circumferences 304c, 306c, 308c of the seed pillows 304a, 306a, 308a may provide additional structural stability of the seam between the first water-soluble film and the second film comprising each seed pillow 304a, 306a, 308a. In this manner, the seed clusters 304b, 306b, 308b may be safely and securely positioned in the seed pillows 304a, 306a, 308a with a significantly negligible potential for the fusion between the water-soluble films to degrade and release the seed clusters 304b, 306b, 308b prematurely. For a clearer illustration of the individual seed pillows 304a, 306a, 308a, FIG. 3B depicts an individual cut seed pillow 320, in accordance with various embodiments described herein.

Figure 3B:
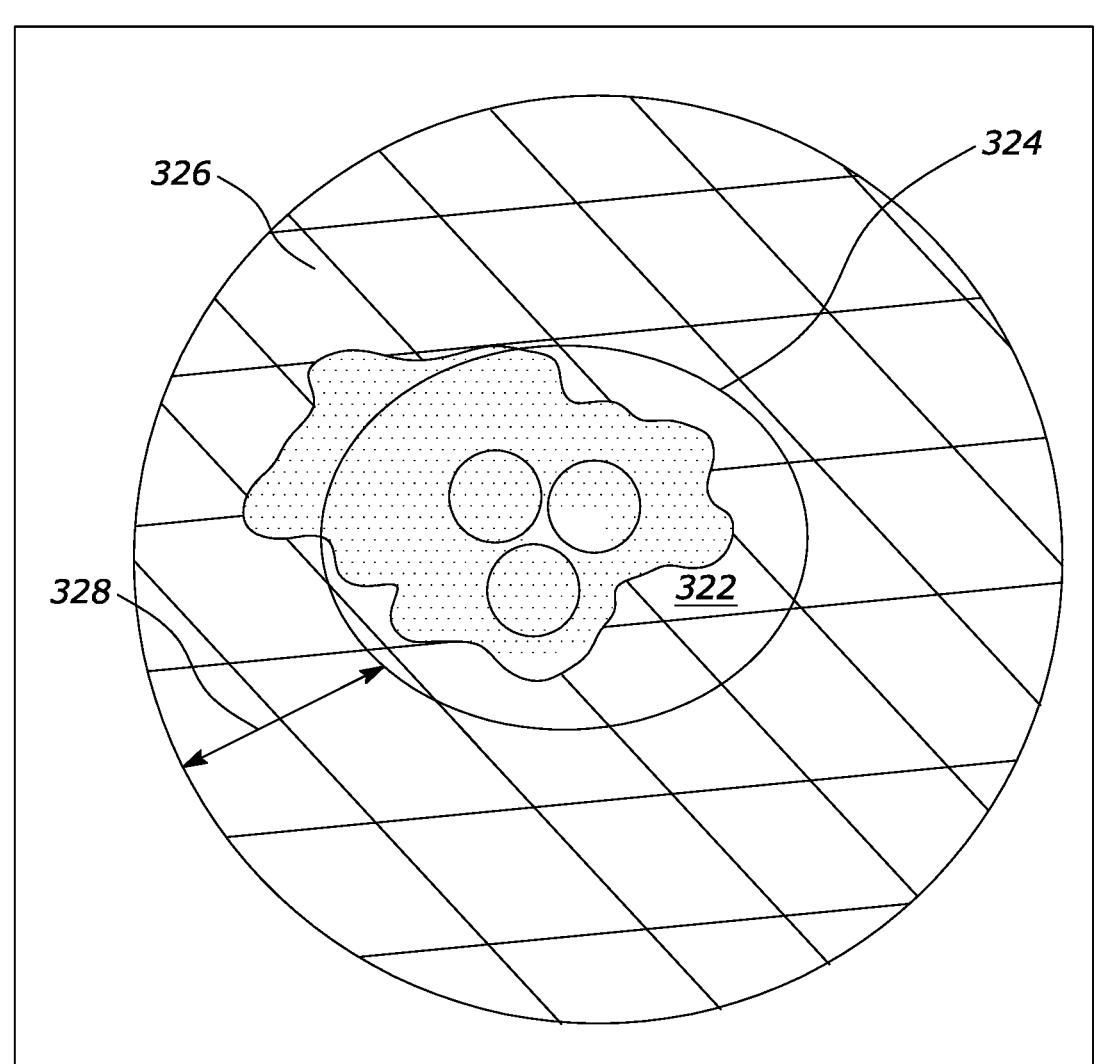
FIG. 3B depicts an individual seed pillow, in accordance with various embodiments described herein.

As illustrated in FIG. 3B, the cut seed pillow 320 includes a seed cluster 322 contained within an unfused center 324. In particular, the cut seed pillow 320 includes an unfused center 324 of the first water-soluble film and the second film, a fused outer circumference 326 of the first water-soluble film and the second film, and the seed cluster 322 disposed within the unfused center 324. As previously mentioned, the first water-soluble film and/or the second film may be comprised of a PVA film and/or any other suitable water-soluble material.

Additionally, the cut seed pillow 320 is cut to have particular shape and dimensions that result in the cut seed pillow 320 being advantageous for sowing. The cut seed pillow 320 may have a diameter of approximately 5-7 mm when it is cut by a cutter device (e.g., cutter device 110) or other suitable cutting device. The fused outer circumference 326 may have a radial width 328 of approximately 1-2 mm, and the unfused center 324 may have a diameter of approximately 2-4 mm. As a result, the overall shape of the cut seed pillow 320 may be circular or generally round, such that sowers may more accurately and consistently sow these cut seed pillows 320, as compared with conventional seed tape products.

Figure 4A:
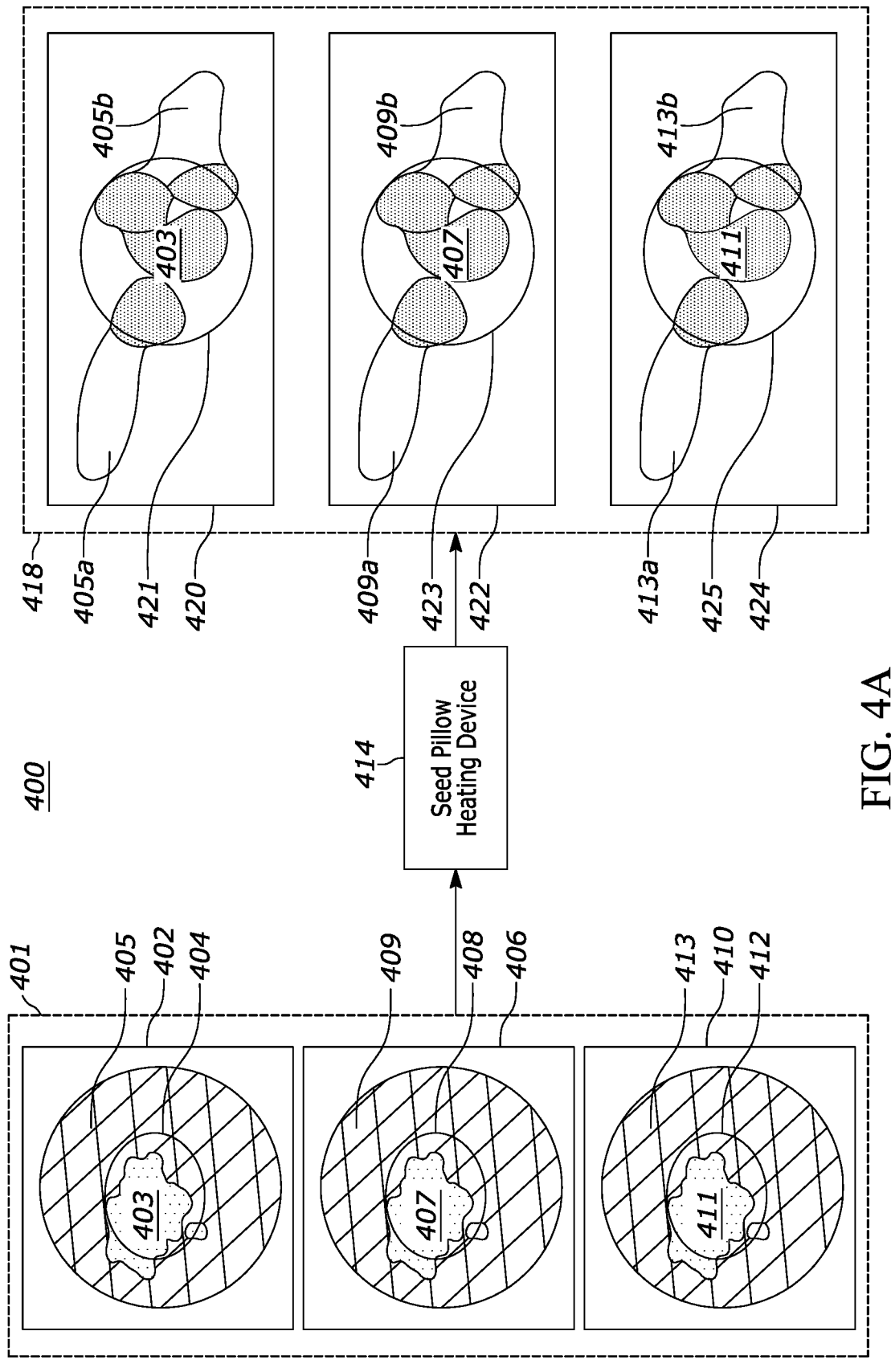
FIG. 4A illustrates an exemplary seed cluster oven heating seed pillows to form shrink-wrapped seed pillows, in accordance with various embodiments described herein.
Figure 4B:
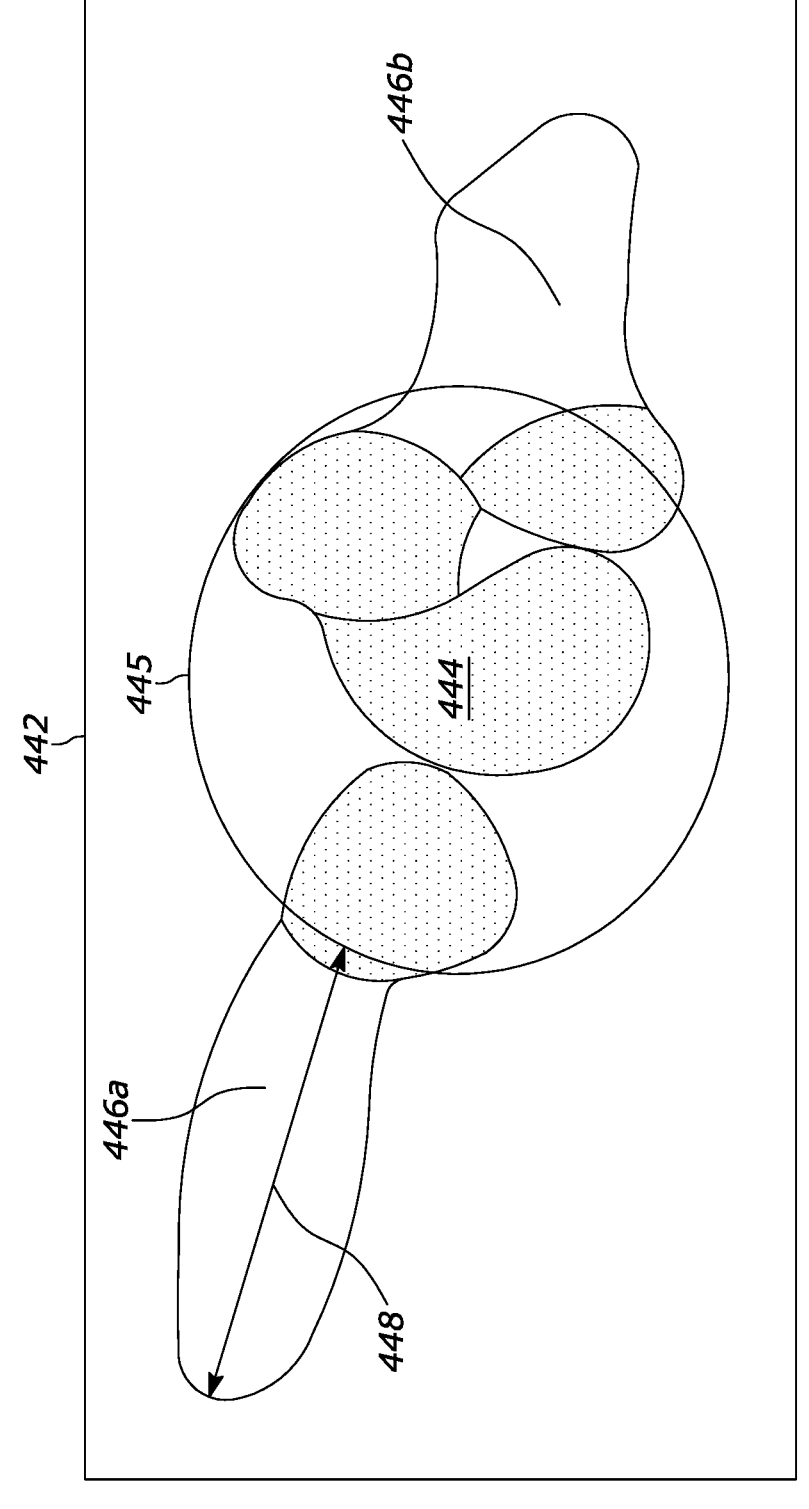
FIG. 4B depicts an individual shrink-wrapped seed pillow, in accordance with various embodiments described herein.

Of course, these dimensions correspond to the cut seed pillows 320 prior to any shrinkage due to heat application or other suitable methods to achieve the shrink-wrapped seed pillows described in reference to FIGS. 4A and 4B. When the cut seed pillows 320 are shrink-wrapped, the dimensions of the seed pillows may accordingly shrink, but the overall form factor of the seed pillows may not. Thus, the advantages derived from the shape and dimensions of the cut seed pillows 320 are maintained through the shrink-wrapping process. In fact, the shrink-wrapped seed pillows may further enhance the advantages previously described by further minimizing the dimensions of the cut seed pillows 320, thereby enabling sowers to achieve a higher throughput of seed pillows during the sowing process without encountering misplaced, jammed, and/or otherwise improperly sown seed pillows.

Exemplary Seed Pillow Shrink-Wrapping

FIG. 4A illustrates an exemplary seed cluster oven 414 heating seed pillows to form shrink-wrapped seed pillows, in accordance with various embodiments described herein. As previously mentioned, the cut seed pillows (e.g., cut seed pillow 320) may generally have a shape and dimension that is advantageous for sowing. When these cut seed pillows are shrink-wrapped, this shape is generally maintained, and the dimension is further reduced to create an even further improved form factor relative to conventional seed tape products.

Accordingly, to achieve this shrink-wrapping, the systems of the present disclosure may transfer a set of cut seed pillows 401 into a seed pillow heating device 414. The seed pillow heating device 414 may apply heat to each cut seed pillow 402, 406, 410 of the set of cut seed pillows 401, thereby shrink-wrapping each cut seed pillow 402, 406, 410 into a shrink-wrapped seed pillow 420, 422, 424 of a set of shrink-wrapped seed pillows 418. More specifically, the seed pillow heating device 414 may receive the set of cut seed pillows 401 from a cutting device (e.g., cutter device 110), and may apply heat to the set of cut seed pillows 401 for a first period of time to shrink the cut seed pillows 402, 406, 410 around the corresponding seed cluster 403, 407, 411.

As an example, the seed pillow heating device 414 may receive the first cut seed pillow 402 from the cutting device. The seed pillow heating device 414 may then apply heat to the first cut seed pillow 402, causing both the unfused center 404 and the fused outer circumference 405 to shrink/collapse around the seed cluster 403. The first cut seed pillow 402 may exit the seed pillow heating device 414 with an appearance similar to the first shrink-wrapped seed pillow 420. As illustrated in FIG. 4A, the first shrink-wrapped seed pillow 420 has a shrink-wrapped center 421 and two shrink-wrapped wings 405a, 405b. The shrink-wrapped center 421 may comprise water-soluble film resulting from the shrinking of the unfused center 404 and/or portions of the fused outer circumference 405 of the first cut seed pillow 402. The shrink-wrapped wings 405a, 405b may comprise water-soluble film resulting from the shrinking of the fused outer circumference 405 of the first cut seed pillow 402.

More generally, the seed pillow heating device 414 may apply heat to the set of cut seed pillows 401 for any suitable period of time that may comprise the first period of time. This period of time may vary based on the particular seeds/seed clusters contained in the seed pillows, the number/type of coatings applied to the seed pillows, the amount of shrinkage required, and/or any other suitable parameters or combinations thereof.

For example, the second cut seed pillow 406 may include a seed cluster 407 with seeds of three different types/varieties, and the third cut seed pillow 410 may include a seed cluster 411 with multiple seeds of a single type/variety. Thus, in this example, the second cut seed pillow 406 may represent a single seed pillow of a first production run, and the third cut seed pillow 410 may represent a single seed pillow of a second production run that is different from the first production run.

In any event, the second cut seed pillow 406 may require a first period on the order of minutes at a relatively low temperature within the seed pillow heating device 414 to achieve the necessary degree of shrink-wrapping because the three different varieties of seeds included in the seed cluster 407 have a relatively low heat tolerance (e.g., germination rates decrease significantly in proportion to high temperature exposure duration). As a result, the second cut seed pillow 406 may enter the seed pillow heating device 414, remain in the device 414 for the first period, and may leave the device 414 with an appearance similar to the second shrink-wrapped seed pillow 422.

More specifically, the second cut seed pillow 406 may leave the seed pillow heating device 414 with a shrink-wrapped center 423 and two shrink-wrapped wings 409a, 409b. The shrink-wrapped center 423 may comprise water-soluble film resulting from the shrinking of the unfused center 408 and/or portions of the fused outer circumference 409 of the second cut seed pillow 406. The shrink-wrapped wings 409a, 409b may comprise water-soluble film resulting from the shrinking of the fused outer circumference 409 of the second cut seed pillow 406.

By contrast, the third cut seed pillow 410 may accommodate a first period on the order of seconds at a relatively high temperature within the seed pillow heating device 414 to achieve the necessary degree of shrink-wrapping because the singular variety of seed included in the seed cluster 410 may have a relatively high heat tolerance. As a result, the third cut seed pillow 410 may enter the seed pillow heating device 414, remain in the device 414 for the first period, and may leave the device 414 with an appearance similar to the third shrink-wrapped seed pillow 424.

More specifically, the third cut seed pillow 410 may leave the seed pillow heating device 414 with a shrink-wrapped center 425 and two shrink-wrapped wings 413a, 413b. The shrink-wrapped center 425 may comprise water-soluble film resulting from the shrinking of the unfused center 412 and/or portions of the fused outer circumference 413 of the third cut seed pillow 410. The shrink-wrapped wings 413a, 413b may comprise water-soluble film resulting from the shrinking of the fused outer circumference 413 of the third cut seed pillow 410.

FIG. 4B depicts an individual shrink-wrapped seed pillow 440, in accordance with various embodiments described herein. As illustrated in FIG. 4B, the shrink-wrapped seed pillow 440 includes a seed cluster 444 contained within an shrink-wrapped center 445. In particular, the individual shrink-wrapped seed pillow 440 includes a shrink-wrapped center 445 of the first water-soluble film and the second film, shrink-wrapped wings 446a, 446b of the first water-soluble film and the second film, and the seed cluster 444 disposed within the shrink-wrapped center 445. As previously mentioned, the first water-soluble film and/or the second film may be comprised of a PVA film and/or any other suitable water-soluble material.

Additionally, the individual shrink-wrapped seed pillow 440 is cut and subsequently shrink-wrapped in a manner that results in the individual shrink-wrapped seed pillow 440 having a particular shape and dimensions that result in the individual shrink-wrapped seed pillow 440 being advantageous for sowing. As previously mentioned, the individual shrink-wrapped seed pillow 440 may have a diameter of approximately 5-7 mm after cutting by a cutter device (e.g., cutter device 110) or other suitable cutting device and prior to shrink-wrapping. The individual shrink-wrapped seed pillow 440 may have a diameter of approximately 3-4 mm after receiving heat application from a seed pillow heating device (e.g., seed pillow heating device 414).

Moreover, the shrink-wrapped wings 446a, 446b may have a length 448 of approximately 0.5-1 mm, and the shrink-wrapped center 445 may have a diameter/length of approximately 1-2 mm. As a result, the overall shape of the individual shrink-wrapped seed pillow 440 may be circular or generally round, as well as substantially compact, such that sowers may more accurately and consistently sow these individual shrink-wrapped seed pillow 440, as compared with conventional seed tape products.

Exemplary Method

FIG. 5A depicts a flow diagram representing an exemplary method 500 for producing seed pillows, in accordance with various embodiments described herein. The method may be implemented by any components of the exemplary systems (e.g., exemplary systems 100, 120), and/or any other suitable components described herein or combinations thereof.

The method 500 may include depositing a seed cluster on a first water-soluble film that is disposed on an outer rim of a roller with a plurality of recesses (block 502). The seed cluster may be positioned over a recess of the plurality of recesses, and each recess of the plurality of recesses may include a hole through which suction is applied (e.g., via vacuum device 238). The method 500 may also include applying suction to the first water-soluble film through the hole of the recess to pull the first water-soluble film and the seed cluster into the recess (block 504).

The method 500 may further include rotating the roller through a contact point with an ultrasonic welding wheel to fuse edges of the first water-soluble film to edges of a second film without contacting the seed cluster to create a seed pillow (block 506). In certain embodiments, the ultrasonic welding wheel may vibrate as a frequency, which may be approximately 40 kilohertz (kHz). The method 500 may also include stopping the suction to the first water-soluble film to release the seed pillow from the recess (block 508).

In certain embodiments, the seed pillow may include (i) an unfused center of the first water-soluble film and the second film, (ii) a fused outer circumference of the first water-soluble film and the second film, and/or (iii) the seed cluster disposed within the unfused center.

In some embodiments, the seed pillow is included in a fused film strip with fused portions of the first water-soluble film and the second film extending beyond the seed pillow. Further in these embodiments, the method 500 may further include a cutter device receiving the seed pillow from the roller, and cutting the seed pillow from the fused film strip. Moreover, in these embodiments, the method 500 may further include a seed pillow heating device receiving the cut seed pillow from the cutter device, and applying heat to the cut seed pillow for a first period of time to shrink the seed pillow around the seed cluster. Still further in these embodiments, the cut seed pillow may have a first diameter of approximately 6 mm prior to application of the heat to the cut seed pillow, and the cut seed pillow may have a second diameter of approximately 4 mm after application of the heat to the cut seed pillow.

In certain embodiments, the method 500 further includes a coating application device applying a coating to the seed pillow after the roller rotates through the contact point with the ultrasonic welding wheel. In these embodiments, the method 500 may further include the roller applying suction to the first water-soluble film. The method 500 may then include the roller rotating through the contact point with the ultrasonic welding wheel, such that the ultrasonic welding wheel fuses the edges of the second film to edges of a third water-soluble film without contacting the seed cluster or the coating. The third water-soluble film may be positioned over the second film, such that the coating is disposed between the second film and the third water-soluble film. The method 500 may further include the roller applying suction to the first water-soluble film, and stopping suction to the first water-soluble film to release the seed pillow from the recess.

In certain embodiments, the method 500 may further include a seed hopper receiving seed clusters, and a vacuum needle inserting a tip of the vacuum needle into the seed hopper. The method 500 may then include applying suction through the tip of the vacuum needle to seed clusters located within the hopper, and moving the tip of the vacuum needle over a distribution channel configured to position seed clusters onto the first water-soluble film. The method 500 may then include stopping the suction to release one or more seed clusters into the distribution channel.

In some embodiments, the method 500 may further include an adhesive application device applying an adhesive compound to individual seeds to form seed clusters. Further in these embodiments, the method 500 may further include a seed cluster breaking device breaking seed clusters into smaller seed clusters. The method 500 may further include a seed cluster adhesion bin that is connected to the adhesive application device positioning seed clusters for additional adhesive compound application from the adhesive application device. The method 500 may further include a seed cluster filtering device filtering seed clusters that satisfy a size threshold into a hopper configured to receive the seed clusters, and filtering seed clusters that fail to satisfy the size threshold into (i) the seed cluster breaking device or (ii) the seed cluster adhesion bin.

In certain embodiments, the first water-soluble film and the second film may be comprised of a polyvinyl alcohol (PVA) film. Further, in some embodiments, each recess of the plurality of recesses is a half-sphere with a 4 mm diameter and a 2 mm depth extending from the outer rim toward a center of the roller.

Figure 5B:
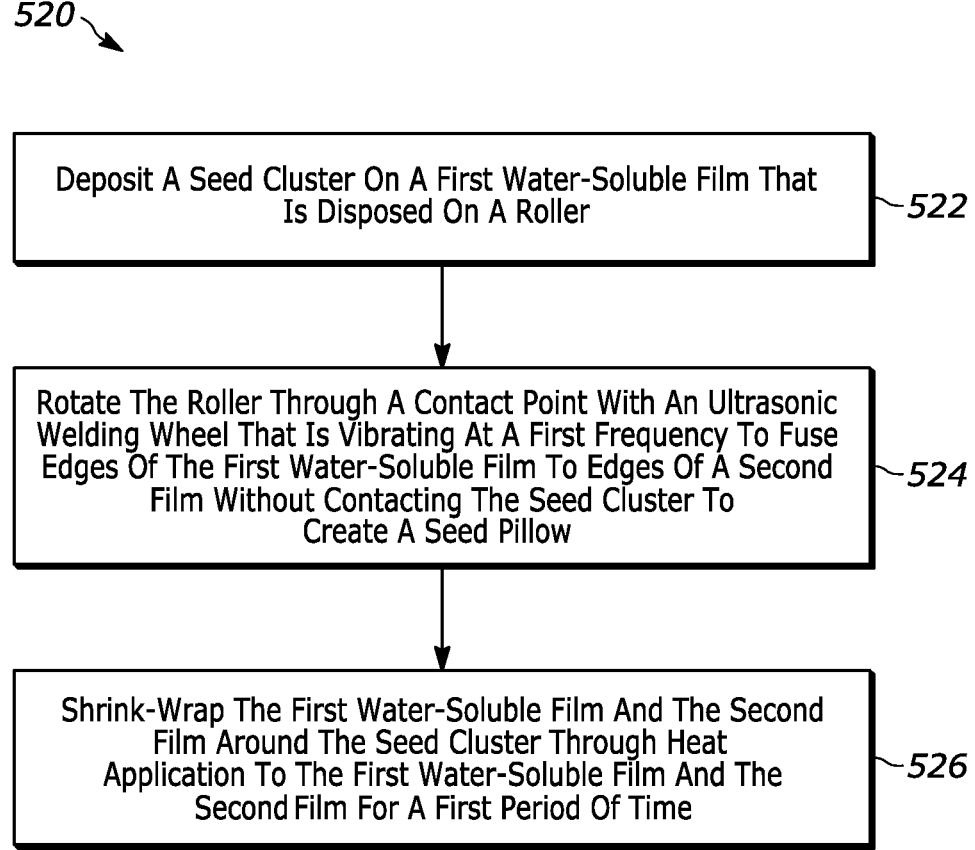
FIG. 5B depicts a flow diagram representing another exemplary method for producing seed pillows, in accordance with various embodiments described herein.

FIG. 5B depicts a flow diagram representing an exemplary method 520 for producing seed pillows, in accordance with various embodiments described herein. The method may be implemented by any components of the exemplary systems (e.g., exemplary systems 100, 120), and/or any other suitable components described herein or combinations thereof.

The method 520 may include depositing a seed cluster on a first water-soluble film that is disposed on a roller (block 522). The method 520 may further include rotating the roller through a contact point with an ultrasonic welding wheel that is vibrating at a frequency to fuse edges of the first water-soluble film to edges of a second film without contacting the seed cluster to create a seed pillow (block 524). The method 520 may further include shrink-wrapping the first water-soluble film and the second film around the seed cluster through heat application to the first water-soluble film and the second film for a first period of time.

In certain embodiments, the method 520 may include an ultrasonic welding wheel vibrating at a frequency to cause the ultrasonic vibrations, and the first water-soluble film and the second film being compressed at a contact point between the ultrasonic welding wheel and a roller to fuse the edges of the first water-soluble film to the edges of the second film.

In some embodiments, the shrink-wrapped seed pillow further comprises: (i) an unfused center of the first water-soluble film and the second film, (ii) a fused outer circumference of the first water-soluble film and the second film, and (iii) the seed cluster disposed within the unfused center.

In certain embodiments, the edges of the first water-soluble film and the second film may have a first diameter of approximately 6 millimeters (mm) prior to the heat application, and the edges of the first water-soluble film and the second film have a second diameter of approximately 4 mm after the heat application. Further in certain embodiments, the first water-soluble film and the second film may be comprised of a polyvinyl alcohol (PVA) film.

Of course, the dimensions of the first water-soluble film and the second film may be determined based on the size of cutter device. For example, the cutter device may include cutting apparatuses configured to cut/punch the first water-soluble film and the second film into 4 mm, 6 mm, and/or 8 mm diameter circles. Accordingly, the edges of the first water-soluble film and the second film may have a first diameter of approximately 4 mm, 6 mm, 8 mm, and/or any other suitable dimension(s) prior to the heat application.

Further, in some embodiments, the edges of the first water-soluble film and the second film may shrink into a pair of shrink-wrapped wings around the seed cluster after the heat application, and the pair of shrink-wrapped wings have a length of approximately 1 mm. It should be understood that the width of the seed pillow around the seed cluster may shrink by approximately 50% or more as a result of the heat application, and the seed pillow may become an approximate sphere around the seed cluster. For example, the first water-soluble film and the second film may be approximately 20 mm wide, such that the unfused center of the seed pillow may be up to approximately 18 mm. Thus, in this example, the unfused center of the seed pillow may shrink by a significant percentage from the original 18 mm diameter to the approximate dimension of the seed cluster (e.g., approximately 2-4 mm). Of course, it should also be appreciated that the total shrinkage of the seed pillow may depend on the size of the seed cluster disposed in the unfused center. As an example, if the seed cluster is approximately 6 mm in diameter, and the unfused center is approximately 8 mm in diameter, then the unfused center of the seed pillow may only shrink by up to approximately 2 mm around the seed cluster.

In some embodiments, the shrink-wrapped seed pillow may further comprise: a third water-soluble film that is positioned over the second film, the third water-soluble film having edges that are fused to edges of the second film from the ultrasonic vibrations. In these embodiments, the shrink-wrapped seed pillow may further include a coating that is disposed between the second film and the third water-soluble film. Moreover, the coating may comprise at least one of: (i) a growth regulator, (ii) a bacteria, (iii) a fungus, (iv) a fungicide, or (v) a fertilizer.

In certain embodiments, the seed cluster may be one seed. In other embodiments, the seed cluster may be a plurality of seeds that are adhered together through application of an adhesive compound prior to disposition on the first water-soluble film.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for evaluation properties, through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A seed pillow, comprising:
a first water-soluble film;
a seed disposed on the first water-soluble film;
a second film that is positioned over the first water-soluble film and the seed, the second film having a first portion that is fused to a second portion of the first water-soluble film;

a coating applied to an exterior surface of the second film; and
a third water-soluble film positioned over the exterior surface of the second film, the third water-soluble film having a third portion that is fused to the first portion of the second film from ultrasonic vibrations.

2. The seed pillow of claim 1, wherein the first water-soluble film and the second film are shrink-wrapped around the seed through heat application to the first water-soluble film and the second film for a first period of time.

3. The seed pillow of claim 1, wherein an ultrasonic welding wheel vibrates at a frequency to cause the ultrasonic vibrations, and the first water-soluble film and the second film are compressed at a contact point between the ultrasonic welding wheel and a roller to fuse the second portion of the first water-soluble film to the first portion of the second film.

4. The seed pillow of claim 1, further comprising: (i) an unfused center of the first water-soluble film and the second film, (ii) a fused outer circumference of the first water-soluble film and the second film, and (iii) the seed disposed within the unfused center.

5. The seed pillow of claim 2, wherein the second portion of the first water-soluble film and the first portion of the second film have a first diameter of approximately 6 millimeters (mm) prior to the heat application, and the second portion of the first water-soluble film and the first portion of the second film have a second diameter of approximately 4 mm after the heat application.

6. The seed pillow of claim 1, wherein the first water-soluble film and the second film are comprised of a polyvinyl alcohol (PVA) film.

7. The seed pillow of claim 1, wherein the coating comprises at least one of: (i) a growth regulator, (ii) a bacteria, (iii) a fungus, (iv) a fungicide, or (v) a fertilizer.

8. The seed pillow of claim 1, wherein a plurality of seeds are disposed on the first water-soluble film, the plurality of seeds comprises the seed, and the plurality of seeds are adhered together through application of an adhesive compound prior to disposition on the first water-soluble film.

9. The seed pillow of claim 2, wherein the second portion of the first water-soluble film and the first portion of the second film shrink into a pair of shrink-wrapped wings around the seed after the heat application, and the pair of shrink-wrapped wings have a length of approximately 1 mm.

10. A seed pillow, comprising:
a first water-soluble film;
a seed disposed on the first water-soluble film;
a second film that is positioned over the first water-soluble film and the seed, the second film having a first portion that is fused to a second portion of the first water-soluble film;
a third water-soluble film that is positioned over the second film, the third water-soluble film having a third portion that is fused to the first portion of the second film; and
a coating that is disposed between the second film and the third water-soluble film.

11. The seed pillow of claim 10, wherein the first water-soluble film and the second film are shrink-wrapped around the seed through heat application to the first water-soluble film and the second film for a first period of time.

12. The seed pillow of claim 11, wherein the second portion of the first water-soluble film and the first portion of the second film have a first diameter of approximately 6 millimeters (mm) prior to the heat application, and the second portion of the first water-soluble film and the first portion of the second film have a second diameter of approximately 4 mm after the heat application.

13. The seed pillow of claim 11, wherein the second portion of the first water-soluble film and the first portion of the second film shrink into a pair of shrink-wrapped wings around the seed after the heat application, and the pair of shrink-wrapped wings have a length of approximately 1 mm.

14. The seed pillow of claim 10, further comprising: (i) an unfused center of the first water-soluble film and the second film, (ii) a fused outer circumference of the first water-soluble film and the second film, and (iii) the seed disposed within the unfused center.

15. The seed pillow of claim 10, wherein:

the first water-soluble film and the second film are comprised of a polyvinyl alcohol (PVA) film; and the coating comprises at least one of: (i) a growth regulator, (ii) a bacteria, (iii) a fungus, (iv) a fungicide, or (v) a fertilizer.

16. The seed pillow of claim 10, wherein a plurality of seeds are disposed on the first water-soluble film, the plurality of seeds comprises the seed, and the plurality of seeds are adhered together through application of an adhesive compound prior to disposition on the first water-soluble film.

17. A method for producing seed pillows, the method comprising:

depositing a seed on a first water-soluble film that is disposed on a first roller;

rotating the first roller through a first contact point with a first ultrasonic welding wheel that is vibrating at a frequency to fuse a first portion of the first water-soluble film to a second portion of a second film without contacting the seed to create a seed pillow;

applying a coating to an exterior surface of the second film; and rotating a second roller through a second contact point with a second ultrasonic welding wheel to fuse the second portion of the second film to a third portion of a third water-soluble film, the third water-soluble film being positioned over the exterior surface of the second film.

18. The method of claim 17, further comprising:

shrink-wrapping the first water-soluble film and the second film around the seed through heat application to the first water-soluble film and the second film for a first period of time.

\* \* \* \* \*